Dec. 1, 1964 G. RIDDELL ETAL 3,159,716

LINK CIRCUIT

Filed Sept. 27, 1962 31 Sheets-Sheet 1

INVENTORS G. RIDDELL
C. A. THROCKMORTON
BY J. A. McCorkendale
ATTORNEY

Dec. 1, 1964

G. RIDDELL ETAL 3,159,716

LINK CIRCUIT

Filed Sept. 27, 1962

31 Sheets-Sheet 3

Dec. 1, 1964 G. RIDDELL ETAL 3,159,716
LINK CIRCUIT
Filed Sept. 27, 1962 31 Sheets-Sheet 5

Dec. 1, 1964 G. RIDDELL ET AL 3,159,716

LINK CIRCUIT

Filed Sept. 27, 1962 31 Sheets-Sheet 6

Dec. 1, 1964 G. RIDDELL ETAL 3,159,716

LINK CIRCUIT

Filed Sept. 27, 1962 31 Sheets-Sheet 7

Dec. 1, 1964 G. RIDDELL ETAL 3,159,716

LINK CIRCUIT

Filed Sept. 27, 1962 31 Sheets-Sheet 8

Dec. 1, 1964 G. RIDDELL ETAL 3,159,716

LINK CIRCUIT

Filed Sept. 27, 1962 31 Sheets-Sheet 9

Dec. 1, 1964 G. RIDDELL ET AL 3,159,716

LINK CIRCUIT

Filed Sept. 27, 1962 31 Sheets-Sheet 10

Dec. 1, 1964 G. RIDDELL ETAL 3,159,716

LINK CIRCUIT

Filed Sept. 27, 1962 31 Sheets-Sheet 13

LINK CIRCUIT

Filed Sept. 27, 1962 31 Sheets-Sheet 14

Dec. 1, 1964 G. RIDDELL ETAL 3,159,716

LINK CIRCUIT

Filed Sept. 27, 1962 31 Sheets-Sheet 15

LINK CIRCUIT

Filed Sept. 27, 1962

Dec. 1, 1964 G. RIDDELL ETAL 3,159,716

LINK CIRCUIT

Filed Sept. 27, 1962 31 Sheets-Sheet 20

Dec. 1, 1964 G. RIDDELL ETAL 3,159,716

LINK CIRCUIT

Filed Sept. 27, 1962 31 Sheets-Sheet 21

Dec. 1, 1964 G. RIDDELL ET AL 3,159,716

LINK CIRCUIT

Filed Sept. 27, 1962 31 Sheets-Sheet 23

Dec. 1, 1964 G. RIDDELL ETAL 3,159,716

LINK CIRCUIT

Filed Sept. 27, 1962 31 Sheets-Sheet 24

LINK CIRCUIT

United States Patent Office 3,159,716
Patented Dec. 1, 1964

3,159,716
LINK CIRCUIT

George Riddell, Lincroft, and Charles A. Throckmorton, Shrewsbury, N.J., assignors to Bell Telephone Laboratories, Incorporated, New York, N.Y., a corporation of New York Filed Sept. 27, 1962, Ser. No. 226,616
15 Claims. (Cl. 179—18)

This invention relates to telephone switching systems and more particularly to link circuits for use in such systems.

In certain types of automatic telephone switching systems, it is usual to include a link circuit for selectively providing access from a plurality of incoming or originating units, such as line finders, to a plurality of detecting or receiving units, such as originating registers, and ultimately to a selector. Priorly, telephone subscribers have generally been provided with a single standard type of signaling mechanism, namely a rotary dial, and originating registers needed therefore only to be provided for normal rotary dial signals. There is now being introduced into the telephone plant, however, a much faster type of signaling utilizing pushbutton control and multifrequency signals and which has been designated TOUCH-TONE or MF signaling. Accordingly, a different arrangement must be provided for the originating registers for this type of signaling.

Additionally, as is often the case, these two types of subscriber signaling may be present in the same telephone system. It is therefore necessary to identify whether a dial pulse originating register or a TOUCH-TONE originating register is required for a particular call. Rotary dial pulse originating registers, as known in the art, comprise circuitry for counting the direct-current dial pulses which have been transmitted from the customer's dial, translating them into the desired two-out-of-five code, and directing the resultant translating through a steering chain to the register relays of the originating register from which they can be delivered, by dial pulse repeaters, to other common control circuitry. A multifrequency originating register, however, must include a multifrequency receiver and converter circuit for converting the MF or TOUCH-TONE signals into the two-out-of-five pulse code and directing the resultant pulse code to the register relays.

Converter circuits are known for producing dial pulses for a step-by-step or other office in response to these multifrequency signals from a pushbutton subset. Further, as described, for instance, in F. C. Kuchas application Serial No. 58,758, filed Sept. 27, 1960 and issued May 12, 1964 as United States Patent 3,133,155, the converter may be arranged to work with circuits where either rotary dial or multifrequency signaling may be present. Thus the converter may be arranged to respond to multifrequency calling signals and to release from the register circuit whenever rotary dial pulses are transmitted.

These converter circuits are relatively expensive. It is therefore desirable to limit the number that must be provided for any given installation. However, it is not possible either completely to segregate the lines having MF signaling or to limit the lines to but a single group though an attempt should be made to concentrate the TOUCH-TONE subscribers on the same line finders. What is known is that a particular line finder will or will not have connected to it a line utilizing MF signaling. Advantageously, therefore, there should be provided sufficient registers with converter circuits for the number of line finders which may forward TOUCH-TONE or MF signals while utilizing the less expensive solely rotary dial pulse registers only for those line finders to which no MF signaling lines are connected.

Normally a link circuit is subjected to relatively heavy traffic conditions, and, for purposes of efficient and economical functioning of the over-all system, the link circuit should, of course, be capable of operating over long periods of time without maintenance difficulties. Also, it should be capable of selecting the originating registers on an equitable basis, that is, the various registers should be seized in proper rotation so far as feasible so that over a given period all registers will have participated in substantially the same number of connections. When different types of registers may be involved, the circuit will also have to balance the selection of registers with respect to the types of registers and still be able to handle abnormal traffic conditions.

Thus, for purposes of economical operation, each link circuit should be capable of handling connections between a relatively large number of incoming units and the correspondingly required number of registers and, at the same time, should be capable of handling without delay the high calling rate prevailing during periods of peak load.

Accordingly, it is an object of our invention to improve the arrangement and operation of link circuits.

A more specific object of the invention is to improve the operation of link circuits from the standpoints of efficiency, maintenance and useful life.

A still further specific object of the invention is to increase the simultaneous call handling capabilities of a link circuit.

Still another object of our invention is to enable a link circuit to connect to either a dial pulse register or a register capable of handling both dial pulse and multifrequency signaling dependent on the line finder to which the originating line is connected and, further, to allow overflow traffic which cannot be handled by the dial pulse registers to be directed to the combination dial pulse and MF registers.

In accordance with a specific embodiment of our invention, a crossbar type link circuit for providing access from a plurality of line finders to a plurality of originating registers utilizes a primary to secondary crossbar switch arrangement. The line finder connections are to the verticals of the primary or trunk switches and the register subgroups are connected to the horizontals of the secondary or register switches. It will be undestood that the trunks to be served are connected to respective line finders. Two classes of originating registers are provided, one for handling rotary dial calls only and the other for either rotary dial or TOUCH-TONE calls. Class or group selection is governed by cross-connection terminal wiring.

A link control circuit assigns on a preference basis a secondary switch to handle each call. Assignment of the secondary switch depends upon whether there is a link available to handle the call, whether a register is available and which secondary switch has priority for the particular horizontal group.

A feature of our invention is means in the link control circuit whereby a plurality of calls may be set up simultaneously; for example, if five subgroups of originating registers are provided, five simultaneous connections can be set up, one to each subgroup.

Another feature of the invention is the provision of alternate paths for each connection between a primary switch and a secondary switch, either of the paths being selected by the control circuit when setting up a connection.

A further feature of the invention is means effective if an attempted connection of a rotary dial call finds no rotary dial register available, whereby a combined TOUCH- TONE and rotary dial call register will be selected if available.

A still further feature of the invention is automatic transfer means whereby, in the event of undue delay of a connection, transfer is automatically effected from the regular control network to an emergency control network.

Yet another feature of the invention is means whereby an emergency transfer is prevented while any calls are being served; restoral to the normal network is also prevented while any calls are being served.

A full understanding of the arrangement contemplated by the present invention as well as an appreciation of the various advantageous features thereof may be gained from consideration of the following detailed description in connection with the accompanying drawing, in which.

Figure 30:
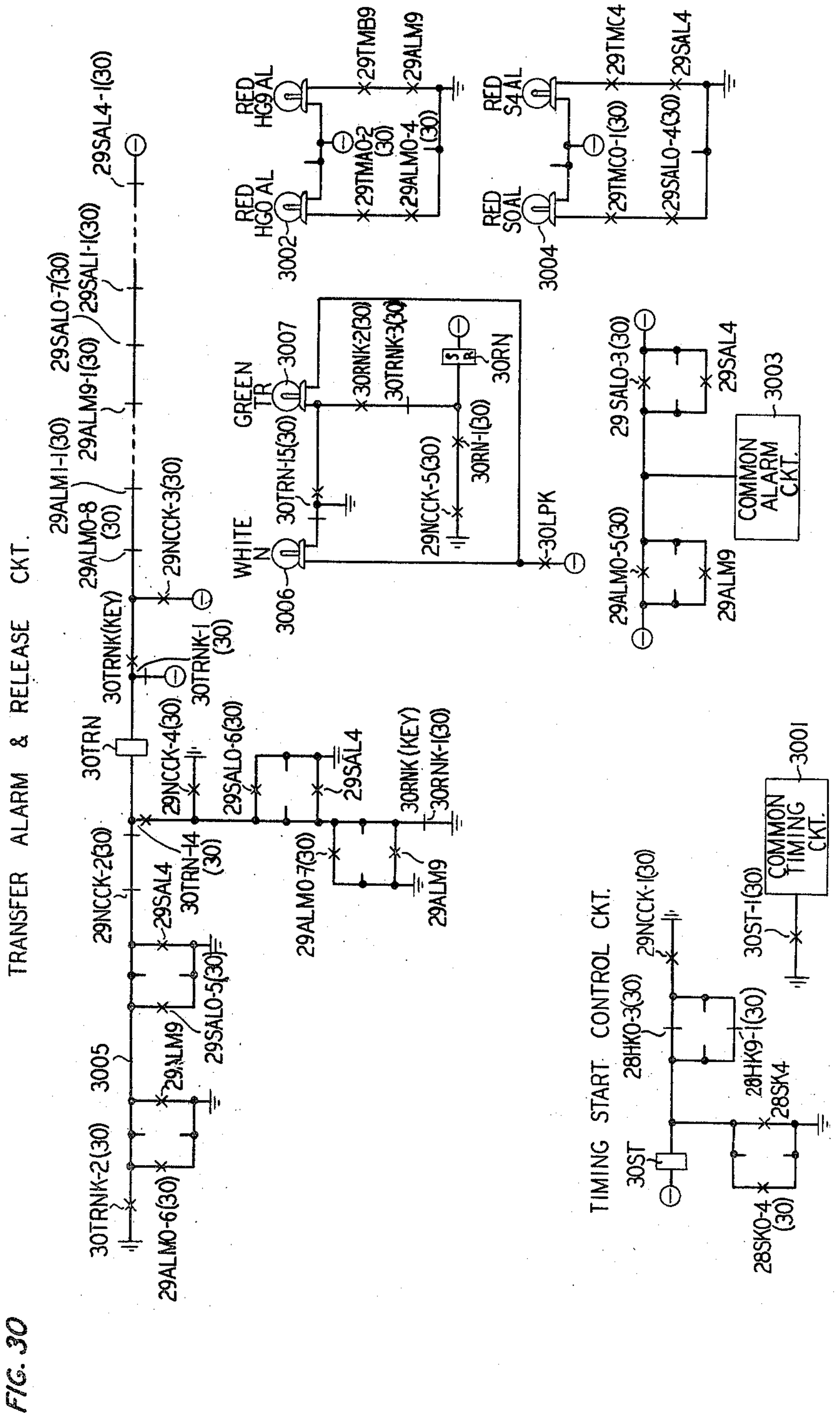
Figure 31:
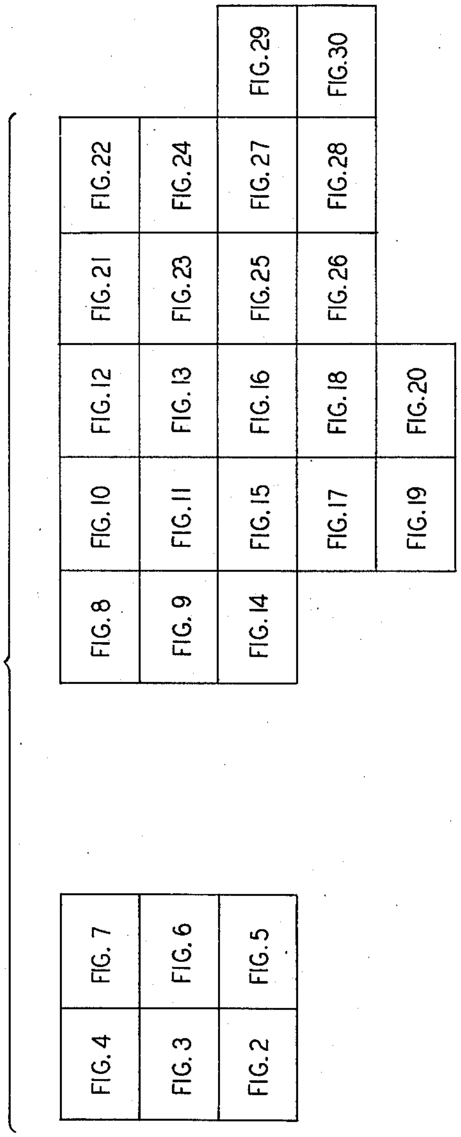
FIG. 31 shows the manner in which certain of the figures should be arranged to show the specific illustrative embodiment of the invention.

The drawing in certain figures utilizes the so-called "detached contact" representation of relays and relay contacts wherein, generally speaking, the contacts are shown separated from the relay windings, the suitable designations being provided to properly indicate the association between the respective contacts and their control windings. This type of disclosure permits functional groups of circuitry to be shown separately thereby facilitating an understanding of the operational features embodied in the system. Normally open, or "make," contacts are represented by an X with proper identifying designation, and normally closed, or "break," contacts are represented by a short straight line with proper identifying designation. To further facilitate consideration of the drawing in conjunction with the specification, the reference designation of most of the equipment items, such as relays, keys, etc., includes a digit prefix indicating the figure of the drawing in which the item appears, for example relay winding 30TRN appears in FIG. 30, while relay 19BC0 winding appears in FIG. 19. (This is not done in the instance of the select and hold magnets, however, since in some instances the magnets are shown in more than one figure in order to better illustrate their functions. Also certain "duplicated" relays, such as some of the "emergency" relays are not actually shown in the drawings although they may be referred to in the specification and, obviously, the use of a prefixed digit in such instances would be pointless.) Further, each relay contact designation includes a digit suffix in parenthesis which indicates the figure of the drawing in which the contact appears; for example contact 30TRN–1(28) is the No. 1 contact of relay 30TRN which appears in FIG. 28 while the relay winding itself, as just stated, appears in FIG. 30.

GENERAL DESCRIPTION OF OVER-ALL SYSTEM

A detailed description of the various circuits involved in the novel link contemplated by the invention will be given subsequently with particular reference to FIGS. 2 to 30, inclusive. However, there will first be given a brief general description of the over-all system, particular reference being made in this connection to FIG. 1.

Figure 1:
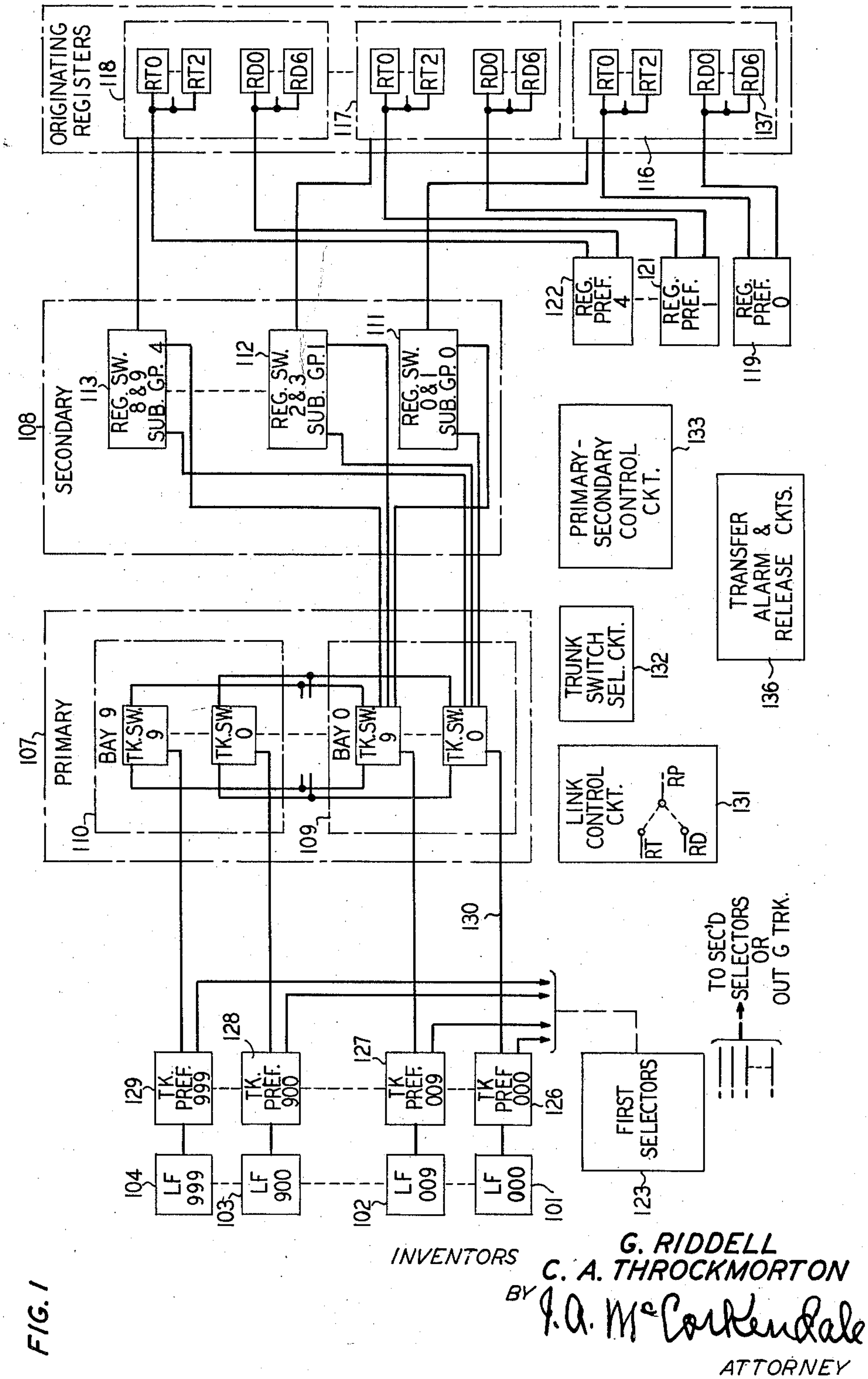
FIG. 1 shows schematically the relationship of representative units of the various individual circuits and equipment elements which comprise one specific illustrative embodiment of the link circuit contemplated by the invention.

Referring then to FIG. 1, there is shown in schematic form an arrangement for a step-by-step telephone system whereby a plurality of line finders, and the respective trunks associated therewith, may be selectively connected to a plurality of originating registers. In the specific illustrative embodiment of the invention to be described, the link circuit is designed to handle 1,000 trunks, each represented of course by a line finder, and to interconnect these trunks, as they are seized for a call, with fifty originating registers. The 1,000 line finders are preferably arranged in groups of ten, and the fifty registers are preferably arranged in five subgroups of ten each. In order to simplify the description so far as possible consistent with full and complete disclosure of the invention, only representative elements are shown, the intervention of other similar elements being indicated by dotted lines. For example, with regard to the 1,000 line finders, only four are shown, two of the first group LF–000, box 101, and LF–009, box 102, representing the ten line finders of that group, and two of the last group, LF–900, box 103, and LF–999, box 104, representing the ten line finders of that group.

The switches of the link are of the crossbar type and are divided into two general groups, the primary or trunk switches, box 107, and the secondary or register switches, box 108. The primary, or trunk, switches are preferably arranged in ten bays, each bay being equipped with ten crossbar switches, each with a capacity of ten trunks or line finders. Two bays, bay 0, box 109, and bay 9, box 110, are shown in the drawing. The secondary, or register, switches are preferably arranged in five subgroups, each subgroup comprising in effect two switches. Three of the five subgroups are shown in the drawing, subgroup 0, box 111, which includes register switches 0 and 1, subgroup 1, box 112, which includes register switches 2 and 3, and subgroup 4, box 113, which includes register switches 8 and 9.

As pointed out above, the originating registers are preferably arranged in five subgroups of ten registers each for a total of fifty. Three of these subgroups are shown in the drawing as boxes 116, 117 and 118. The registers of each subgroup are further divided into two classes or groups as to type, one group being capable of serving rotary dial customers only and the other capable of serving both rotary dial and TOUCH-TONE customers. The relative number of registers in each class or group will be determined by the corresponding number of customers of each type to be served. In the present instance it will be assumed, for purposes of illustration alone, that each subgroup of ten registers comprises seven registers of the first type, that is, serving rotary dial customers alone, and three of the second group serving both dial and TOUCH-TONE customers. Representative registers of each type are shown in the drawing, for example in the instance of register subgroup 116, the first and seventh register of the first type, RD0 and RD6, and the first and third of the second group, RT0 and RT2, are shown.

A register preference circuit is associated with each register subgroup; three of these circuits are shown, register preference circuit 0, box 119, associated with register subgroup 116, register preference circuit 1, box 121, associated with register subgroup 117, and register preference circuit 4, box 122, associated with register subgroup 118.

Data forthcoming from the originating registers based on calling information dialed into the selected registers may be utilized, for example, to control a first selector, box 123.

A trunk preference circuit is associated with each line finder. Four of these circuits are shown in the drawing, trunk preference circuit 000, box 126, associated with line finder 101, trunk preference circuit 009, box 127, associated with line finder 102, trunk preference circuit 900, box 128, associated with line finder 103, and trunk preference circuit 999, box 129, associated with line finder 104.

The general operation of the additional circuits shown, that is the link control circuit 131, the trunk switch selecting circuit 132, the primary-secondary control circuit 133, and the transfer, alarm and release circuits 136 will be described in the immediately following portion of the specification. It will be kept in mind, of course, that these circuits, as well as those previously mentioned above, are all described in detail in the subsequent portions of the specification which are devoted to detailed description.

In order to further describe the contemplated arrangement, still in general terms and still with reference to FIG. 1, let it be assumed that the trunk associated with line finder 101 is seized for a call and it will be assumed, further, that the call has been originated by a rotary dial subscriber on a line finder to which only rotary dial subscribers are connected. Ground applied to the sleeve of the trunk in the usual manner will cause the trunk preference relay of trunk preference circuit 126 to operate. Line finder 101 and trunk preference circuit 126 are connected over lead 130 to the associated trunk switch of the primary group. Operation of the trunk preference relay causes, in turn, operation of the associated horizontal group relay of trunk switch selecting circuit 132. The primary or trunk switches are arranged on a horizontal group basis and each group of switches is associated with a horizontal group selected (HGS) relay of trunk switch selecting circuit 132. The horizontal group selected relay, when operated, disconnects operating battery from all horizontal group relays and associated relays of the particular group thereby permitting recognition and selection of only one primary switch within the horizontal group of switches.

When the trunk preference relay operates as above described, battery is extended to the associated register preference terminal (RP) of the link control circuit 131. This terminal may be connected by local wiring to either an RD (rotary dial) or RT (TOUCH-TONE) terminal depending upon the types of customers' stations served by the line finder connected to that trunk. In the present instance, the connection will have been made to the RD terminal since the call being processed originated at a line finder connected only to rotary dial stations.

The horizontal groups of primary or trunk switches are arranged in pairs with each pair having a different originating register subgroup as first choice. Thus, register subgroup 0, box 116, is first preference for horizontal switch groups 0 and 1, register subgroup 1, box 117, is first preference for horizontal trunk switch groups 2 and 3, and so on. Since the busy or idle condition of the register subgroup is not known when start battery is connected to the RD terminal as above described, the link control circuit 131 is arranged to consider all subgroups and to select that one which is most preferred at the moment. That is, battery is applied to all five start relays of the link control circuit 131, these respective start relays representing both the horizontal group of trunk switches and the five register subgroups. For a register subgroup to be selected the following conditions must be met:

(1) No other horizontal trunk switch group is in the process of setting up a connection to the register subgroup in question;

(2) The register subgroup must contain an idle register; and (3) There must be available an idle link between the horizontal trunk switch group and the register subgroup.

In the present instance, therefore, the maximum number of start relays attempting to operate will be five; only that relay associated with the most preferred register will operate and lock. In accordance with the novel arrangement of link control circuit 131, which will be described in detail subsequently, the particular start relay now operated, and locked in that position, indicates both the horizontal trunk switch group and the register subgroup to be connected or linked. Checks are first performed, however, to determine that only one trunk switch group has selected only one register subgroup.

A novel and particularly important feature of the link control circuit 131 will be mentioned at this point and will be fully described in subsequent portions of the specification. Through provision of novel chain circuit arrangements any one of the horizontal groups of primary or trunk switches has access to all five subgroups of originating registers. It follows from this that five different calls originating in five different horizontal trunk switch groups can be simultaneously served provided there are available idle links to a corresponding number of register subgroups having an idle register at the moment. This feature greatly enhances the value of the link since it renders it capable of handling without delay the high calling rate prevaling during periods of peak load.

When the checking procedures referred to above have been completed and the indications therefrom have been found satisfactory, an idle register in the selected subgroup is indicated by operation of the associated register preference relay in the register preference circuit. Assuming that, in the present instance, register subgroup 116 had been selected, then register preference circuit 0, box 119, would be controlling, and since, as indicated above, the call being processed originated at a line finder having only rotary dial stations, one of the registers RD0 to RD6 of the subgroup would be identified if idle. However, in accordance with a further novel feature of the invention, an "overflow" arrangement is provided, which will be described in detail in subsequent portions of the specification, whereby, in the event no "rotary dial" register of the subgroup is idle, one of the TOUCH-TONE registers, RT0 to RT2 will be assigned to the call if one is idle at the moment, the TOUCH-TONE registers being capable of handling either rotary dial or MF signals. This overflow arrangement becomes effective only when all rotary dial registers are "busy," and the overflow circuit restores to normal immediately upon one or more of the rotary dial registers becoming available. The novel arrangement permits a highly efficient use of the registers since, while it permits assignment of a certain number to the completion of all TOUCH-TONE or MF calls, yet these registers are made available when required, to the more numerous rotary dial calls.

When the register preference relay of circuit 119 operates as above described, a circuit is completed thereby for operating the select magnets of the secondary, or register, switch 108, which are associated with the selected register, which we will assume to be RD6, box 137.

In accordance with an additional novel feature of the link, duplicate paths are provided from each horizontal group of trunk switches to each register subgroup; this provides a highly efficient and flexible connecting system. At this point, therefore, the primary-secondary control circuit 133 operates to determine whether both paths of the present connection are idle and, if it be so indicated, then one of the paths is selected on a "permanently preferred" basis. If only one of the paths is idle at the moment that path is seized.

After a path has been selected or when it has been determined that only one of the paths is available, battery is supplied over the path to operate a primary switch select magnet on the primary or trunk switch being served. Off-normal contacts of the operated primary switch select magnet close a circuit for operating the corresponding primary switch hold magnets. Crosspoint closure on the crossbar switch resulting from closure of the trunk switch hold magnets completes a circuit for operating the secondary or register switch hold magnets.

With all involved crosspoints of the primary and secondary switches now closed, a path is completed from the involved trunk and the line finder 101, through the primary and secondary switches 107 and 108 and associated control circuits to originating register RD6, box 137, and thence to first selector 123. A previous direct connection between the trunk and selector is now interrupted whereby to leave effective only the connection through the selected register.

Transfer, alarm and release circuit 136 includes means for timing certain stages in the connection and when the time required to complete a timed function exceeds the preassigned maximum interval allowed for such function, an alarm is sounded and operations are initiated preparatory to transfer to an emergency network which, in many respects, is a duplicate of the normal network. In accordance with a novel feature of the inventive system, however, means are incorporated in the transfer circuits whereby a test is first made to determine whether any other call is actually in progress, that is, being served, and whereby if such is found to be the case, the transfer is delayed until a check shows that no other calls are then in progress and the link is idle. Further, restoral of the circuit to the normal network after the "alarm" condition has been removed is also prevented while another call is actually in progress. Thus, calls in progress are not interfered with either by transfer to the emergency network or by subsequent restoral to the normal network.

*Primary and Secondary Switches*

Coming now to a more detailed description of the inventive system, it will be in order first to consider the arrangement of the crossbar switches involved since they comprise an important and basic portion of the link. As pointed out above, the switching elements per se comprise the primary, or trunk, switches and the secondary, or register, switches. The trunks, that is, actually, the line finders associated with the trunks, are connected to verticals of the trunk (primary) switches and the subgroups of the originating registers are connected to the horizontals of the register (secondary) switches.

In the present discussion of the switches, particular reference will be made to FIGS. 2 to 7 of the drawing.

Figure 2:
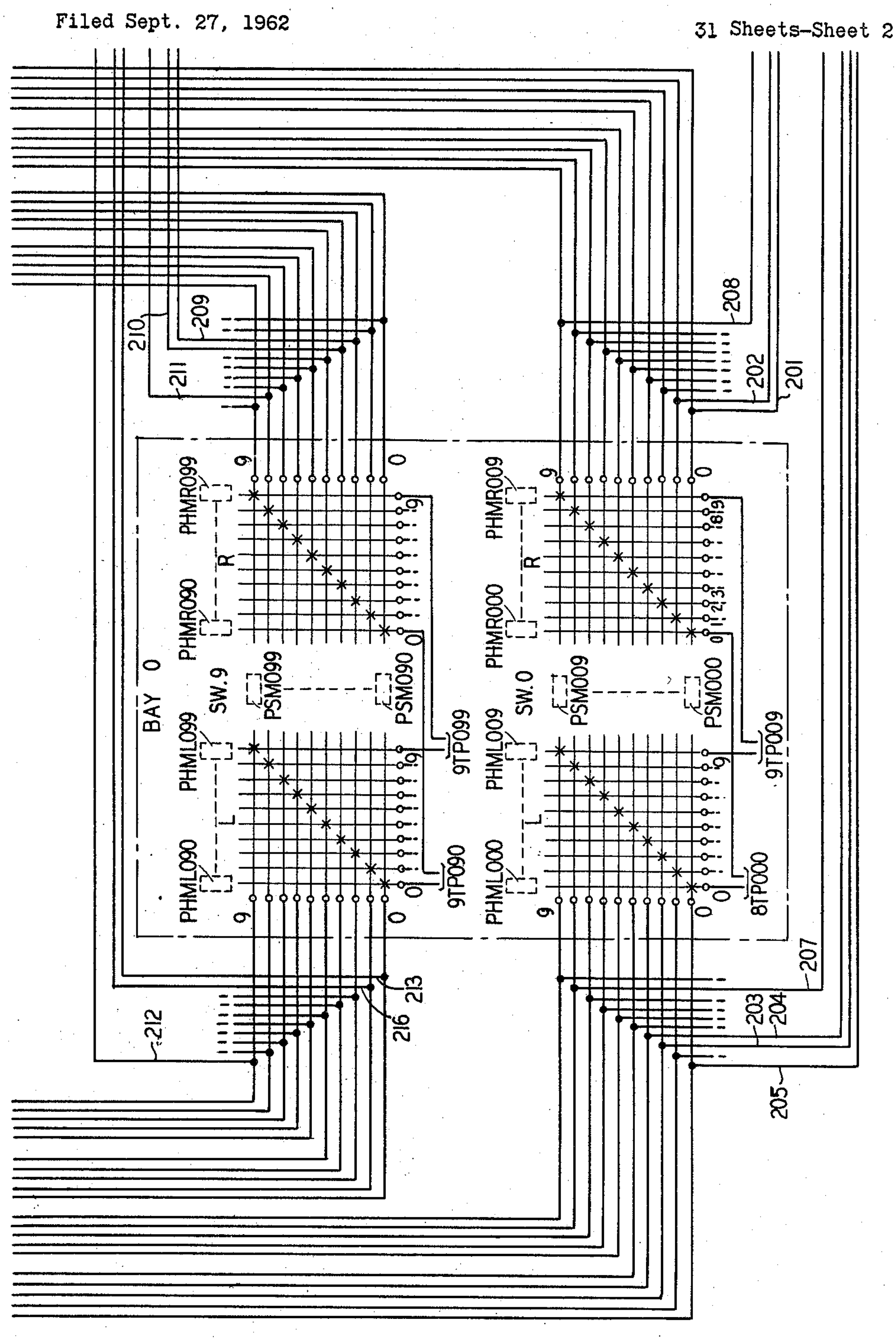
FIGS. 2, 3, 4, 5, 6 and 7 show schematically certain of the primary or trunk switches with the associated secondary or register switches.
Figure 3:
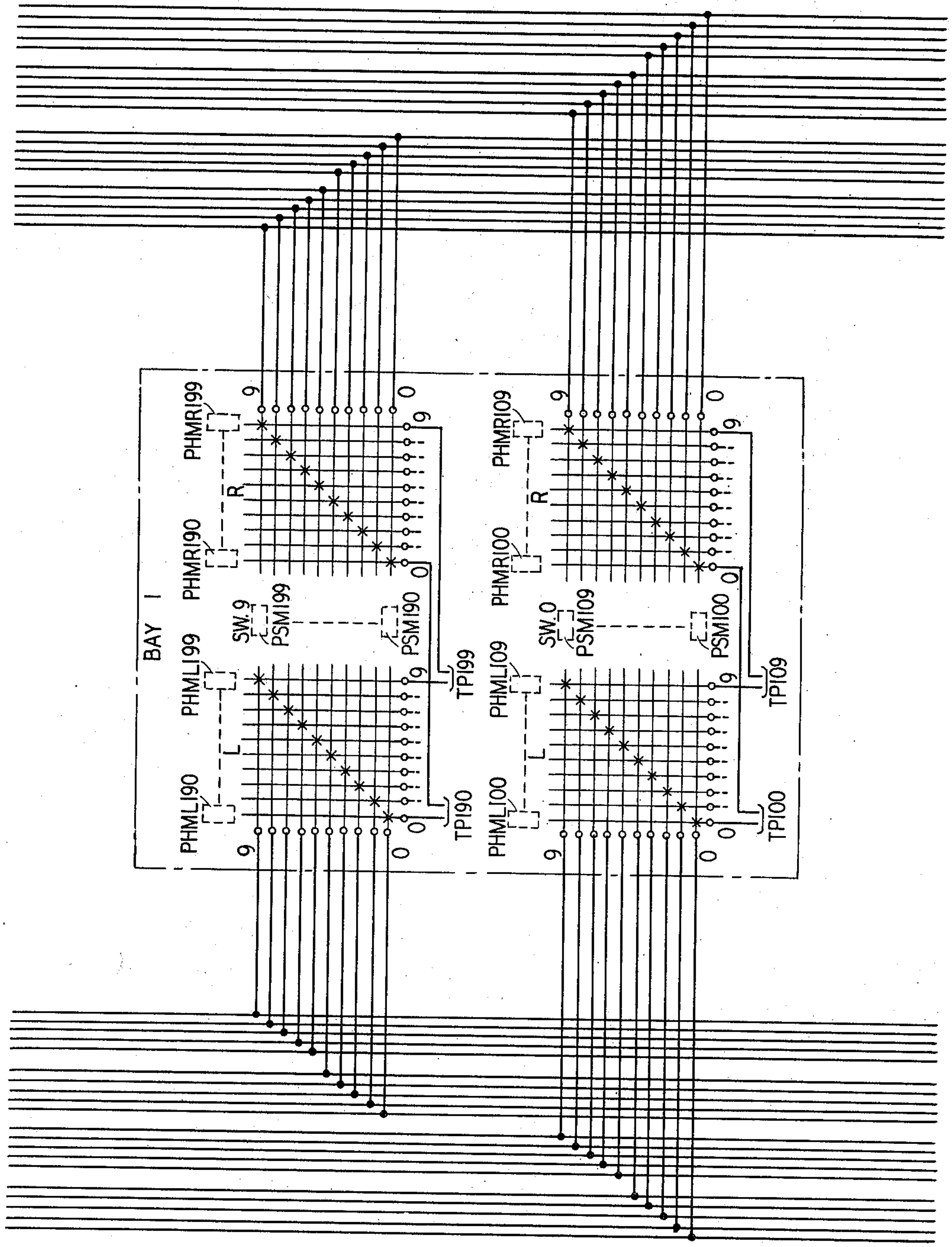
Figure 4:
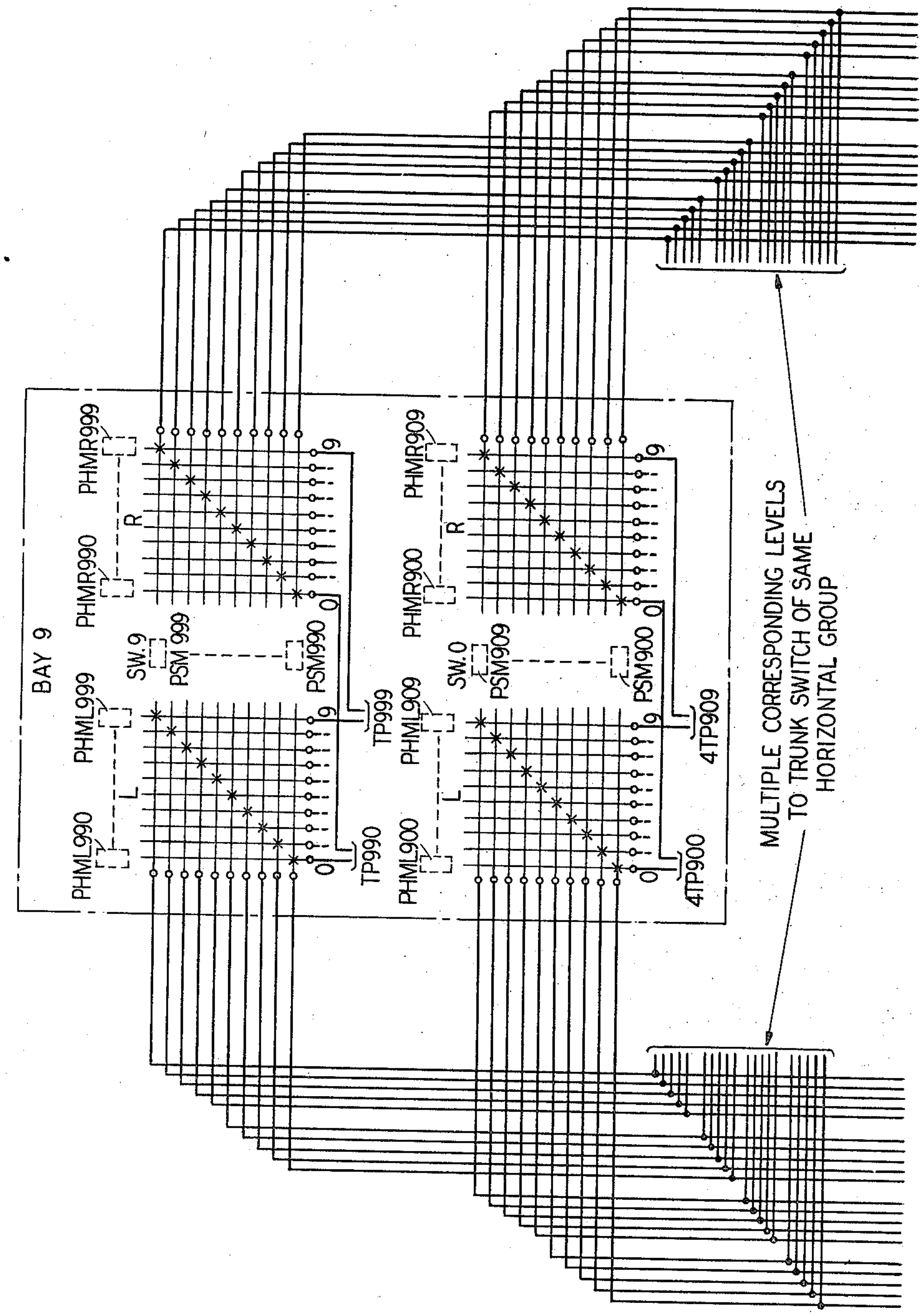

As pointed out previously, the specific illustrative embodiment of the invention which is being disclosed, is designed to provide selective connection between 1,000 trunks (line finders) and fifty originating registers. To this purpose the primary or trunk link comprises ten bays, each bay comprising ten crossbar switches, each switch having a capacity of ten trunks. In FIGS. 2, 3 and 4 of the drawing three of the bays are illustrated, the first, bay 0, the second, bay 1, and the last, bay 9. It will be understood that the seven bays intervening between bays "1" and "9" are of similar arrangement to those illustrated. Each of the three bays illustrated, two of the respective trunk switches are illustrated, the first switch as "0," and tenth, or last switch, as "9." Here again it will be understood that the intervening elements are similar to those illustrated. As shown, each switch is divided electrically into "left" and "right" halves. Select and hold magnets are provided for each switch in accordance with the well-known crossbar switch arrangement and it will be noted that each select magnet is common to both the left and right portions of the respective switch.

As shown, the horizontals of the primary or trunk switches of similar position are connected in multiple. That is, the respective horizontals of the lowest left switch of bay 0 are connected in multiple to the respective horizontals of the lowest left switch of each of the other bays, while the respective horizontals of the lowest right switch of bay 0 are connected in multiple to the respective horizontals of the lowest right switch in each of the other bays. This same multipyling plan is followed with each of the other horizontal groups.

Figure 10:
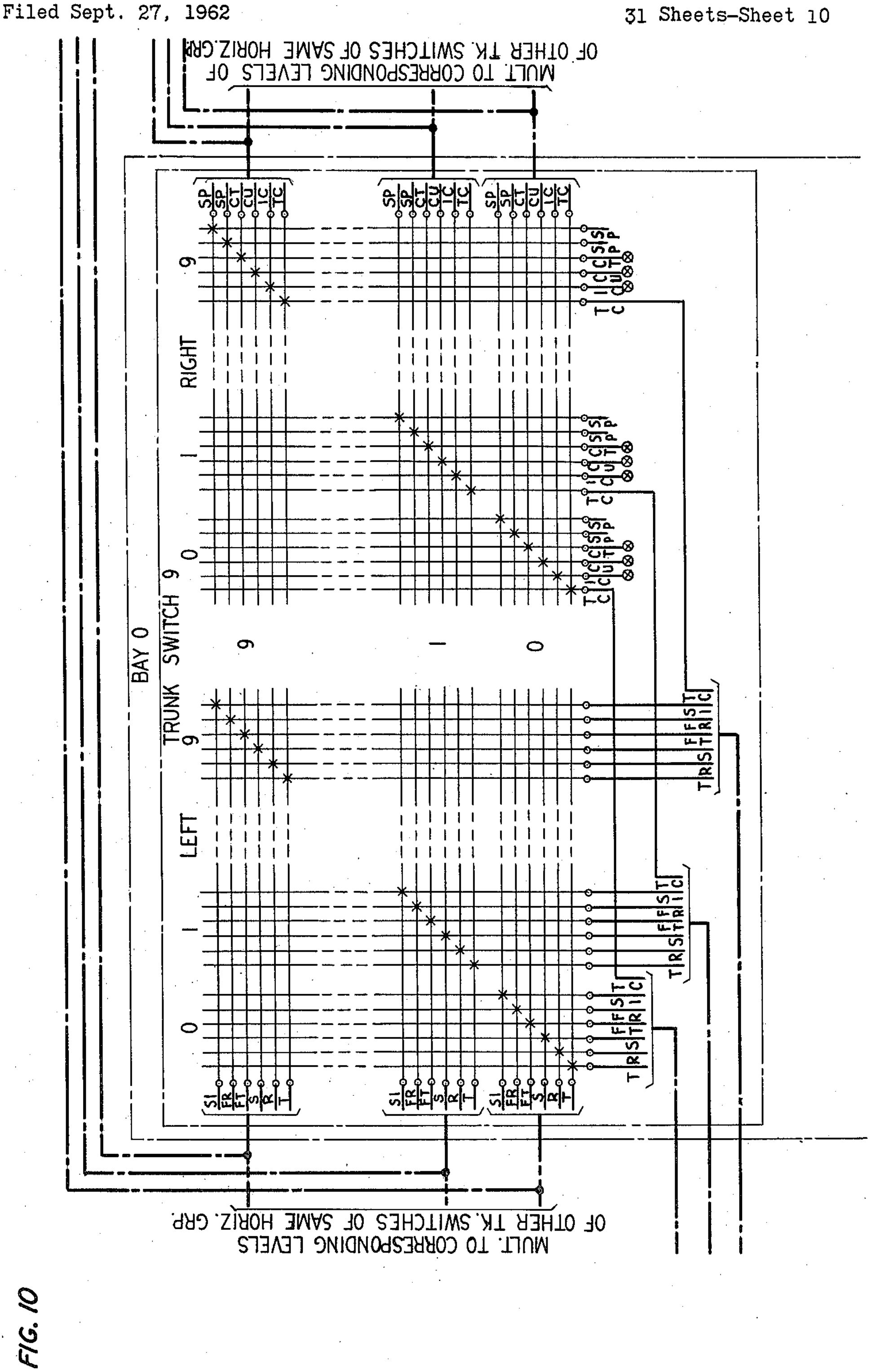
FIGS. 10 and 11 show schematically two representative primary or trunk switches, the connections from the associated trunk preference and lockout circuits being indicated by broken lines.
Figure 11:
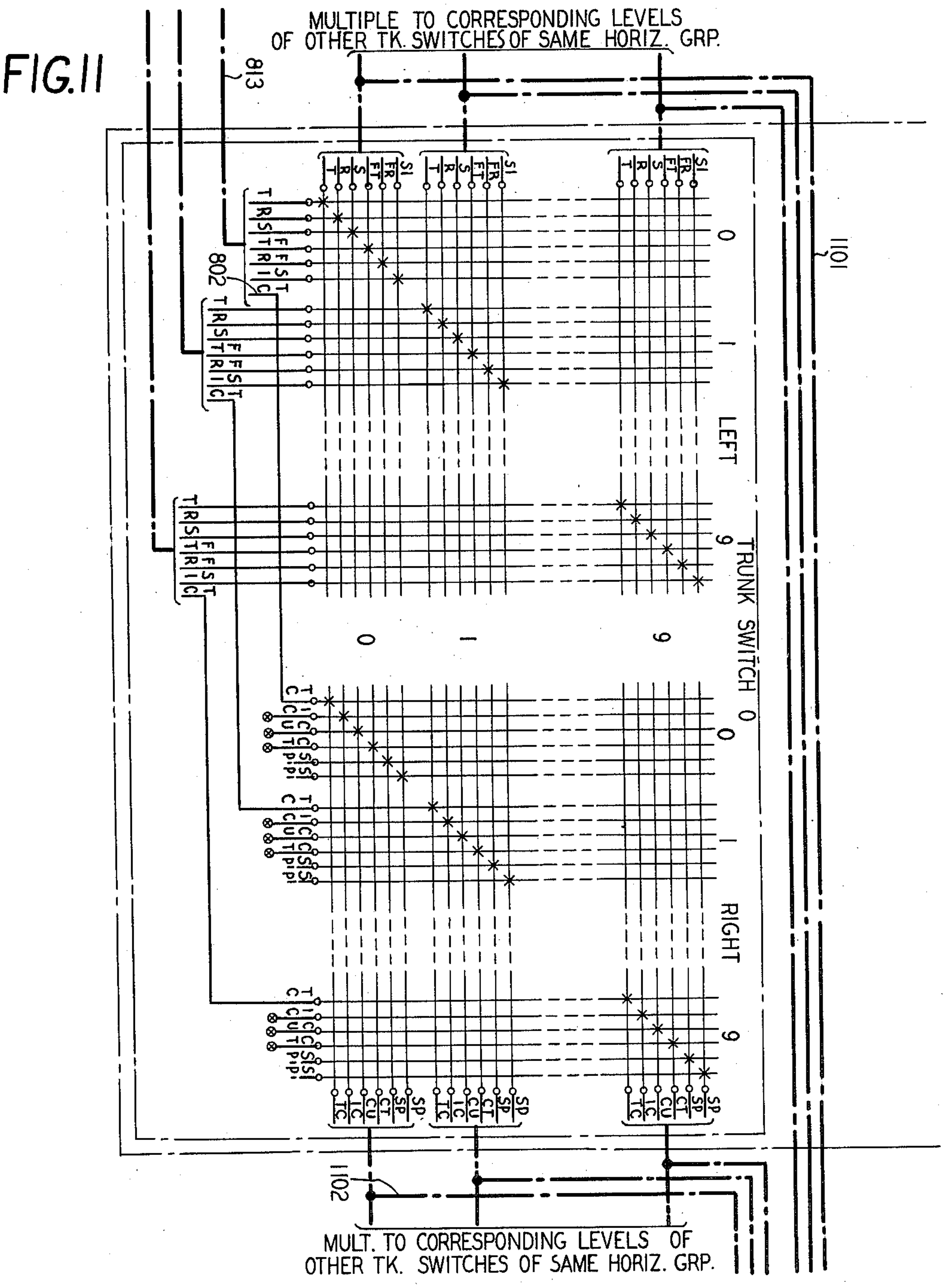
Figure 12:
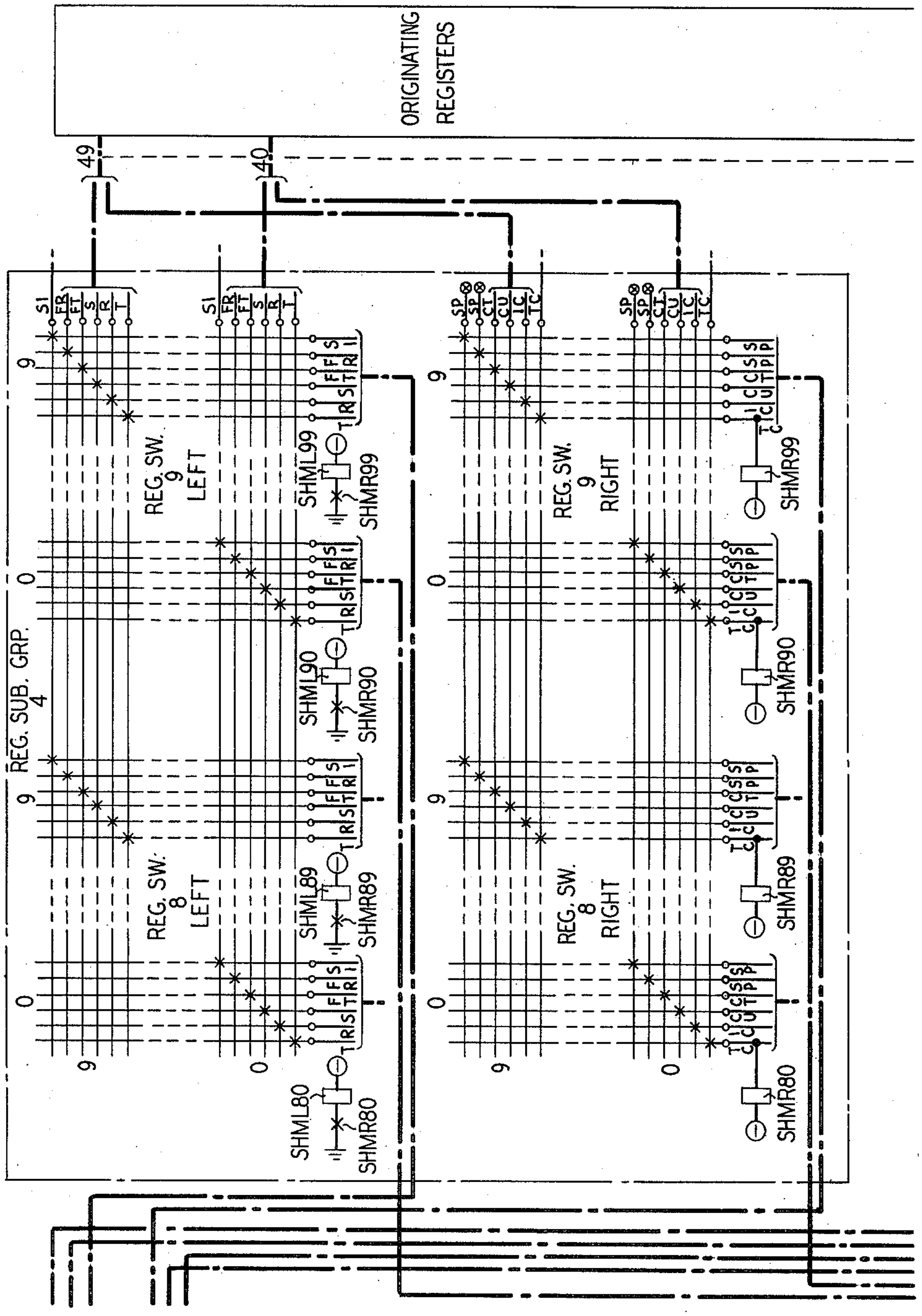
FIGS. 12 and 13 show schematically two representative secondary or register switches, the connections from the associated trunk switches being indicated by broken lines.
Figure 13:
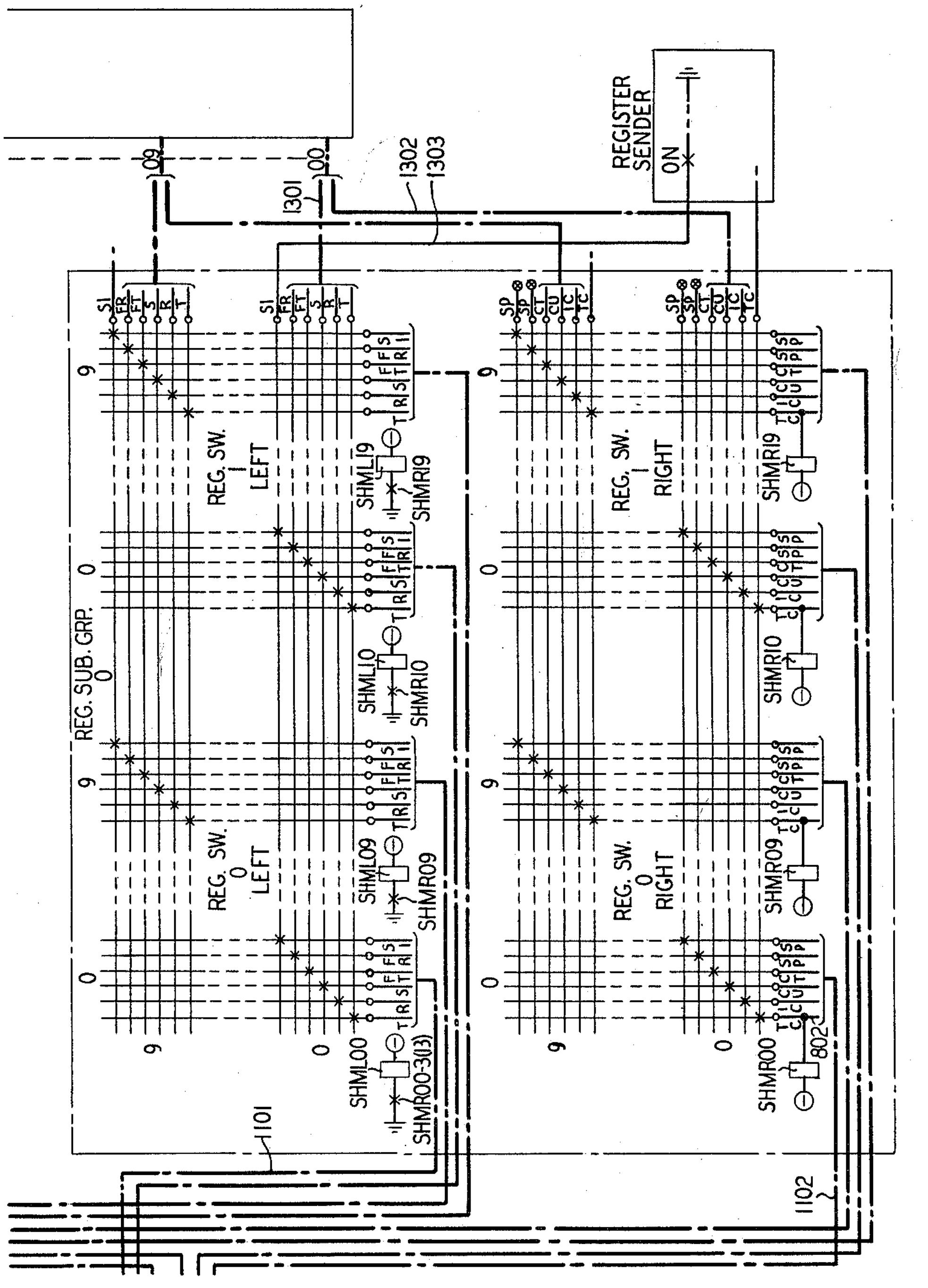
Figure 14:
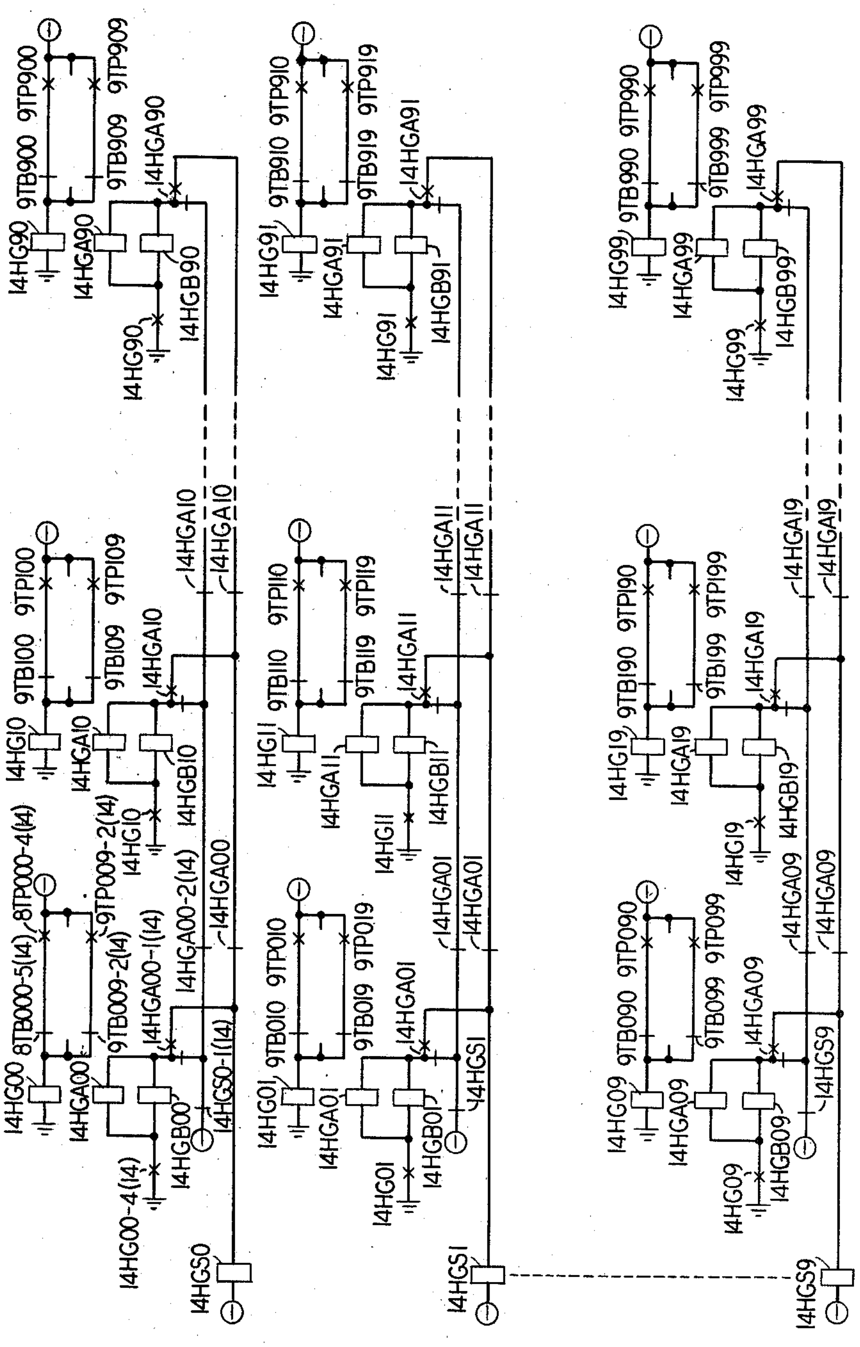
FIG. 14 shows particularly the horizontal group selecting circuits for the trunk switches, the first, second and last rows and the first, second and last columns of each row being shown.
Figure 15:
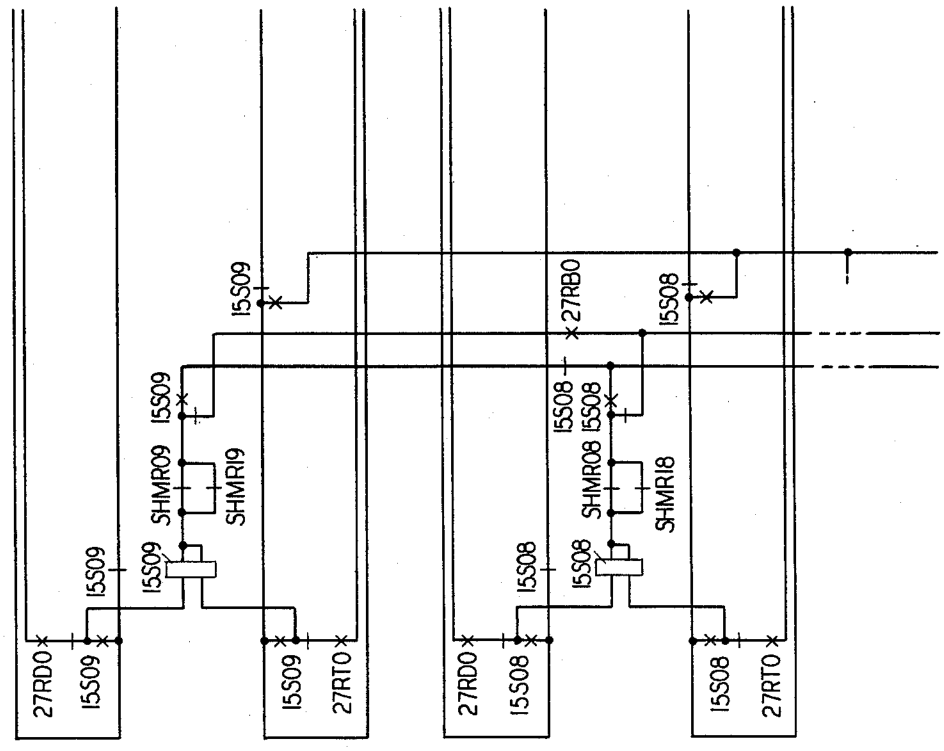
FIGS. 15, 16, 17, 18, 19 and 20 show particularly the link control circuit, the first four and the last two rows and the first, second and last column of each row being shown.

The connections from the thousand trunks being served, that is, the connections from the line finders, are indicated in each instance by two leads; the actual make-up of these connections in each case includes the usual separate tip, ring and sleeve conductors as well as several other leads, and will be so shown in the more detailed disclosure of individual trunk switches provided in FIGS. 10 and 11.

Ten lines are connected by way of the respectively associated line finders to each trunk switch. As indicated, the first trunk is connected by trunk preference relay 8TP000 to left and right verticals 0 of the first switch of bay 0, while the tenth trunk of the same group is connected by trunk preference relay 9TP009 to left and right verticals 9 of the same switch. This connecting plan is followed throughout the entire ten bays with the one-thousandth trunk "999" connected to left and right verticals 9 of the last switch of bay 9.

Figure 5:
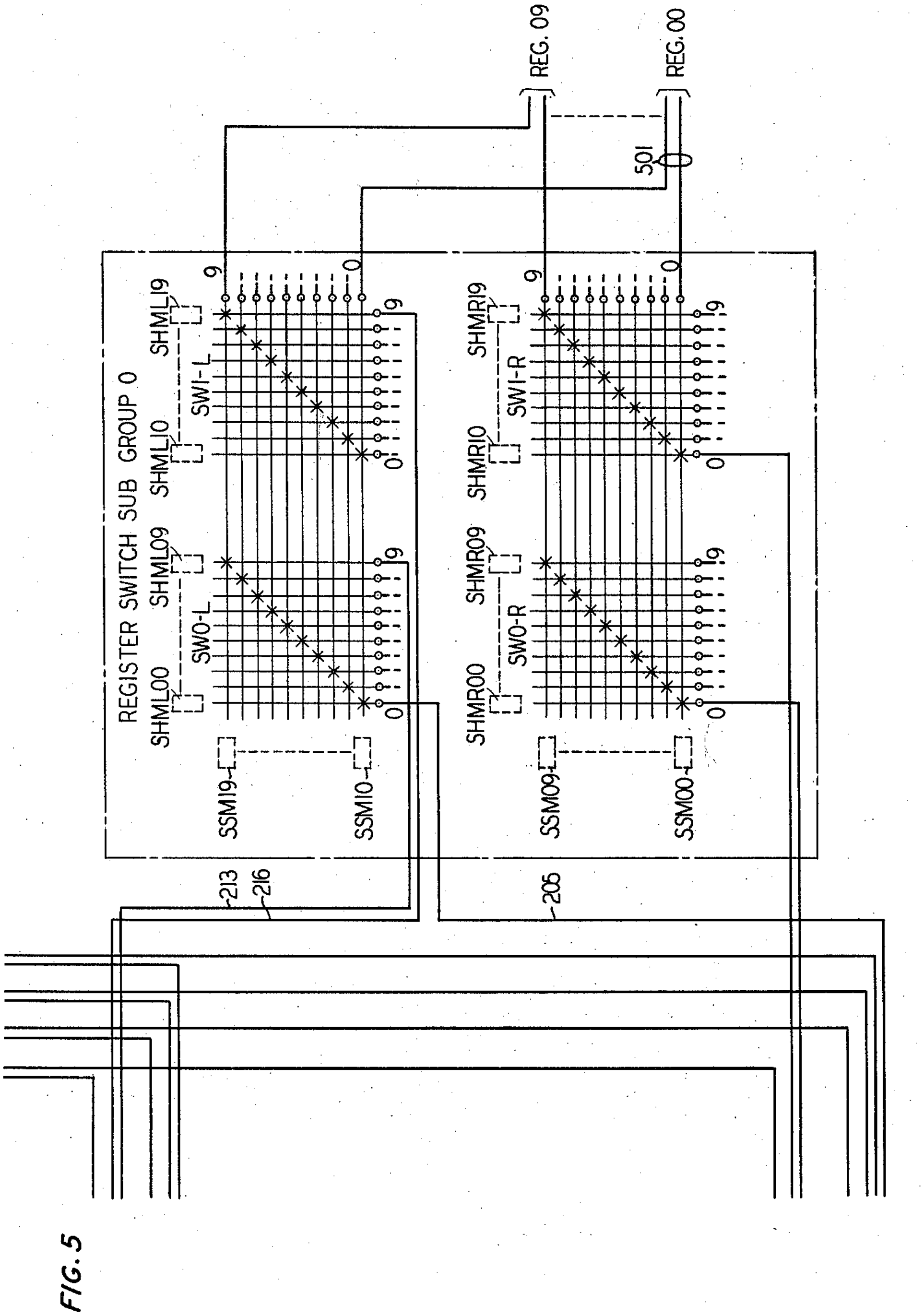
Figure 6:
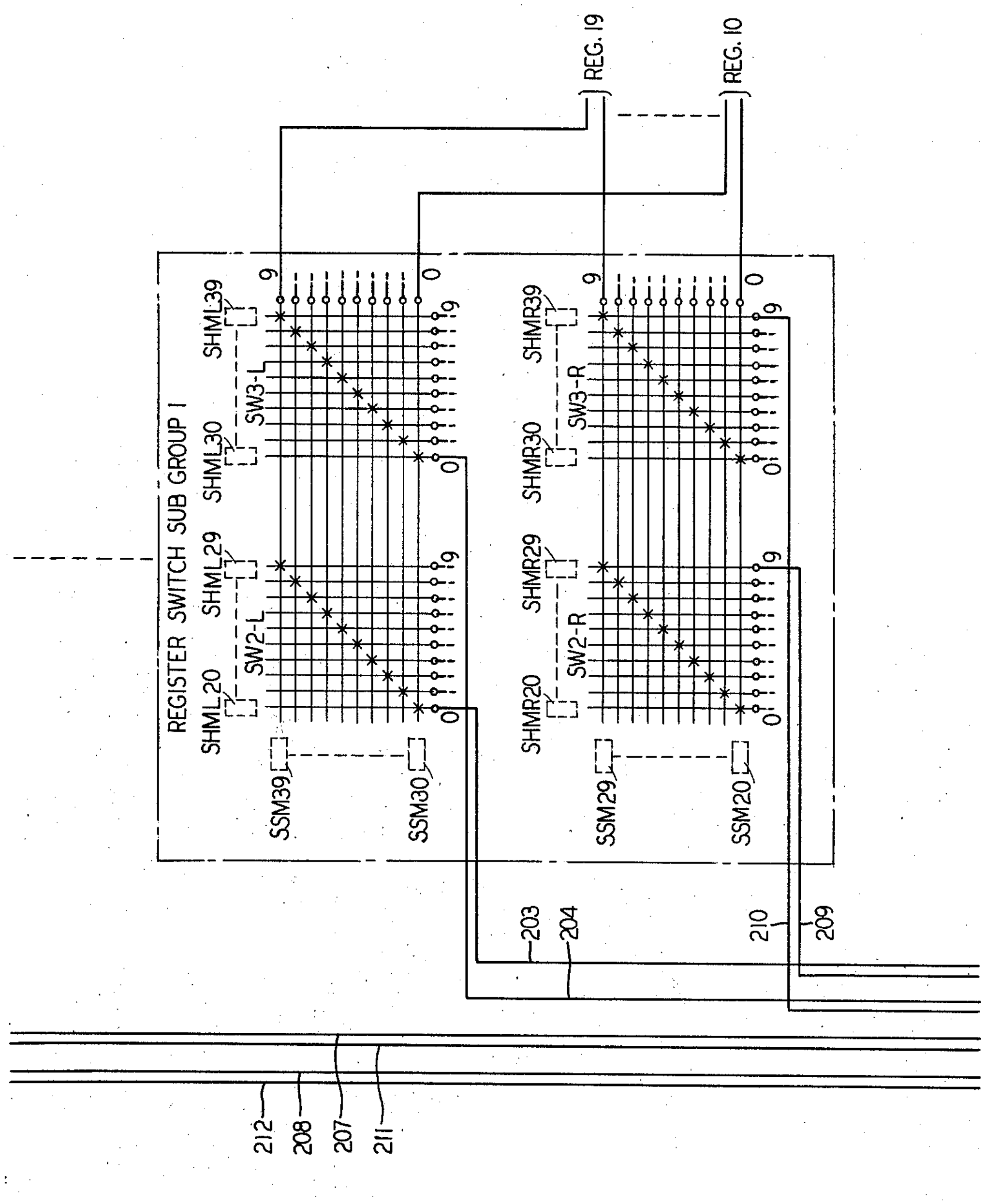
Figure 7:
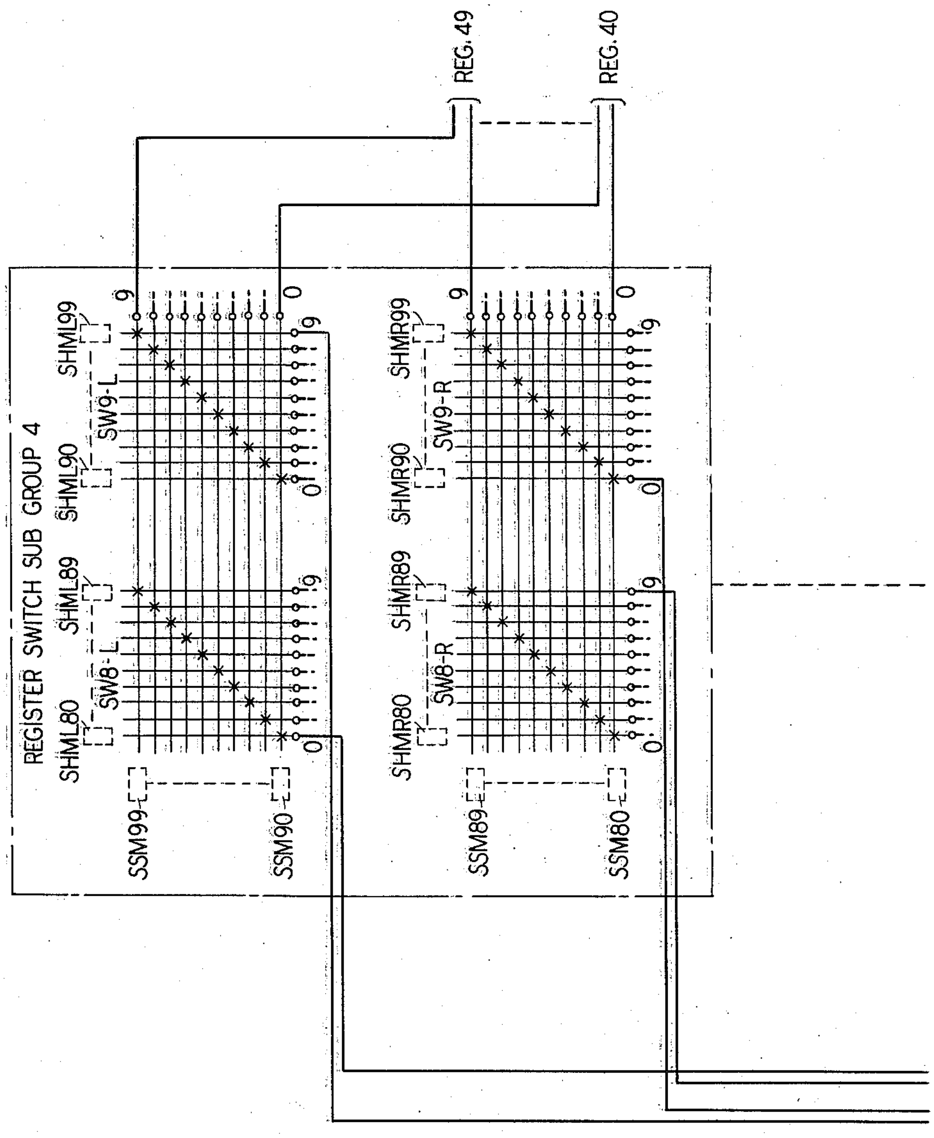

Considering now for the moment the secondary or register switches with specific reference to FIGS. 5, 6 and 7, five register switches are provided, each of which comprises physically two cross bar switches. Three of the register switches are shown, register switch subgroup 0, register switch group 1 and register switch group 4. Intervention of similar switch groups 2 and 3 is indicated by dotted lines. As indicated by bracketed lines and captions, each register switch group connects to ten groups of registers for a total of fifty registers reached through the five switch groups. Here again, as in the instance of the trunk switches, single lines are used to indicate a plurality of conductors in order to avoid undue complication of the drawing; the actual make-up of the connections will be shown in the more detailed showing of individual register switches provided in FIGS. 12 and 13.

It will be noted that the register switches are provided with the usual select and hold magnets, which are typical of the crossbar switch structure, and also that, unlike the trunk switches just described, the left and right sections of the respective switches are not separated electrically.

The respective horizontals of the trunk switches are connected to respective verticals of the register switches by a carefully designed plan which will be referred to herein as an "inversion" plan in view of the interrelationship of the position on the respective switches of connected elements. To illustrate, and as shown in the drawing, level 0 of trunk switch 0(R) is connected by lead 201 to vertical 0 of register switch 0(R) while level 1 of register switch 0(R) is connected by lead 202 to vertical 0 of register switch 1(R). Similarly, level 2 of trunk switch 0(L) is connected by lead 203 to vertical 0 of register switch 2(L). Also level 3 of trunk switch 0(L) is connected by lead 204 to vertical 0 of register switch 3(L) and level 0 of trunk switch 0(L) is connected by lead 205 to vertical 0 of register switch 0(L).

To further illustrate the interconnecting method, level 8 of trunk switch 0(L) is connected over lead 207 to vertical 0 of register switch 8(L) and level 9 of trunk switch 0(R) is connected by lead 208 to vertical 0 of register switch 9(R). Observing the interconnecting plan still further, level 2 of trunk switch 9(R) is connected by lead 209 to vertical 9 of register switch 2(R) and level 3 of trunk switch 9(R) is connected by lead 210 to vertical 9 of register switch 3(R). Also, level 8 of trunk switch 9(R) is connected by lead 211 to vertical 9 of register switch 8(R) and level 9 of trunk switch 9(L) is connected by lead 212 to vertical 9 of register switch 9(L). Level 0 of trunk switch 9(L) is connected by lead 213 to vertical 9 of register switch 0(L) and level 1 of trunk switch 9(L) is connected by lead 216 to vertical 9 of register switch 1(L).

It is believed that the above examples will adequately illustrate the novel interconnecting plan utilized in applicants' link circuit. When the location of a connection on either a trunk or a register switch is known, the location of the other end of the connection may be readily ascertained by the "inversion" formula. It should also be kept in mind that, as pointed out above, respective horizontals of each trunk switch are connected in multiple with horizontals of corresponding levels of each of the other trunk switches.

*Trunk Seizure—Start of Rotary Dial Call*

Figure 8:
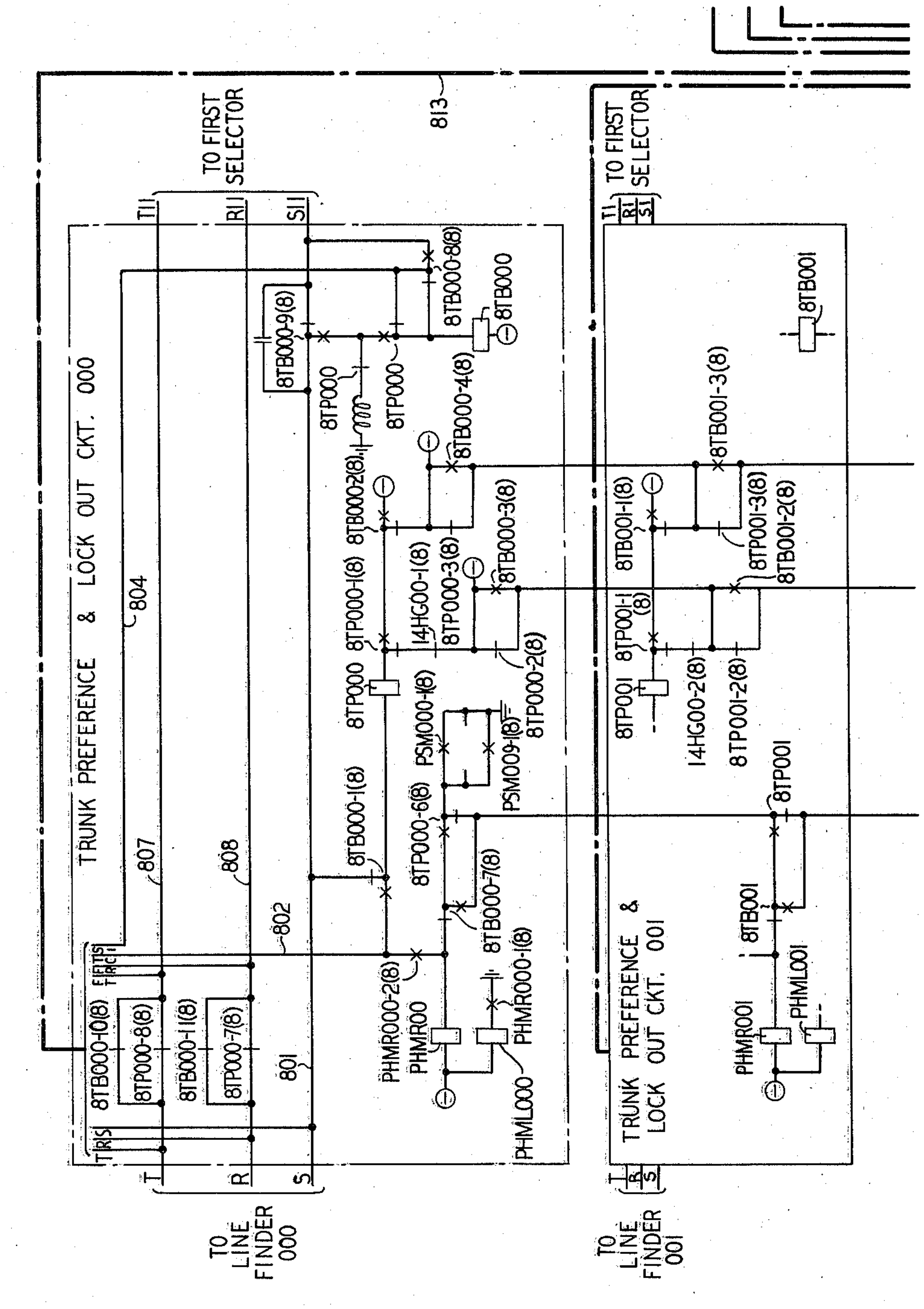
FIGS. 8 and 9 show particularly the trunk preference and lockout circuits, the first circuit being shown in complete detail, the second and third in lesser detail and the last three by captioned boxes.
Figure 9:
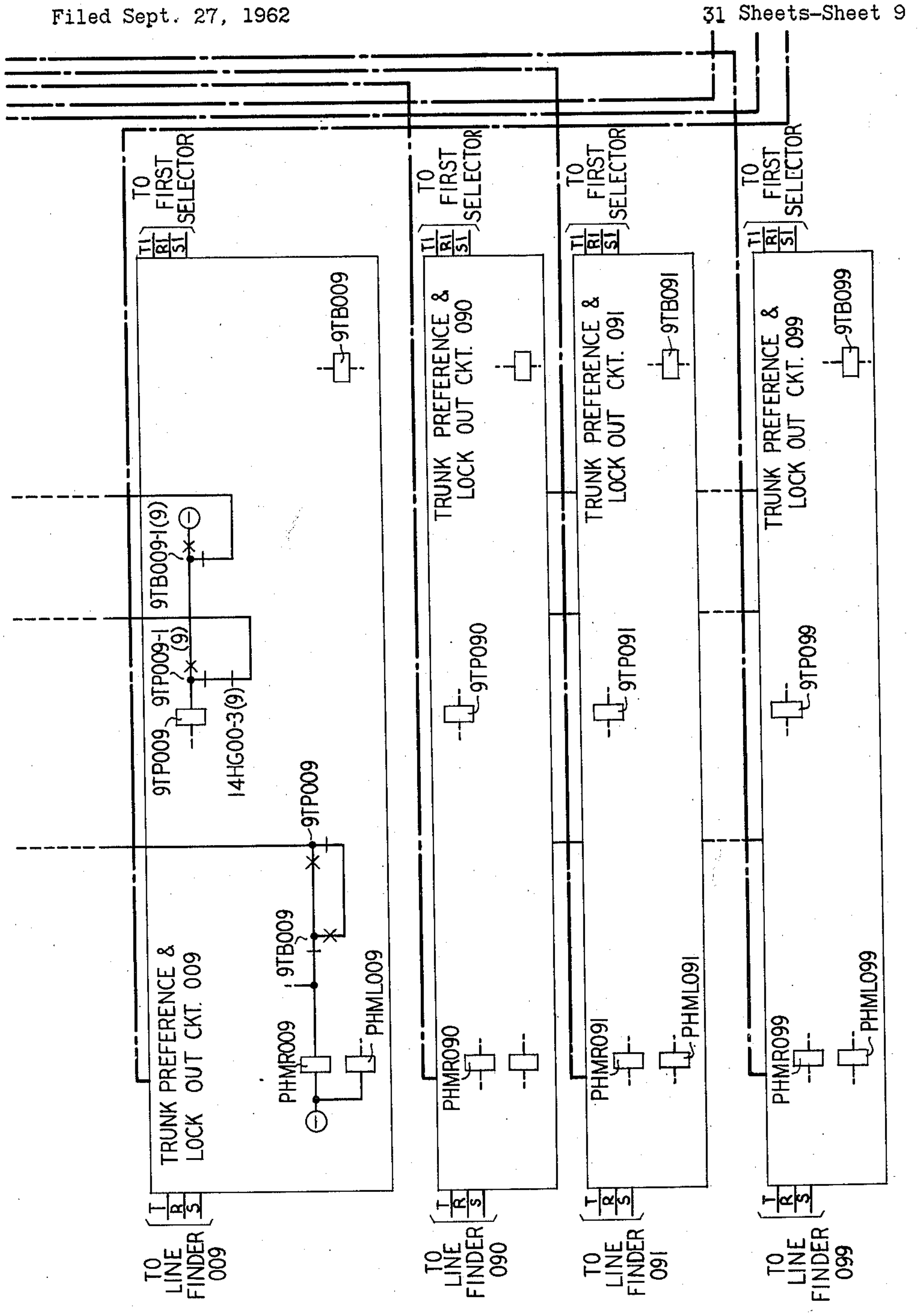

Referring now first to FIGS. 8 and 9, it will be assumed that the "first" trunk of the thousand trunks being served, which trunk and associated line finder will both be designated "000," has been sized for a call. Through normal operation of the associated line finder, ground is connected to the sleeve of the trunk, that is, to sleeve 801. Trunk preference relay 8TP000 operates from this ground through the break contact of transfer pair 8TB000–1(8) of trunk busy relay 8TB000, winding of relay 8TP000, break contact of transfer pair 8TP000–1(8) of the relay, break contact 14HG00–1(8) of relay 14HG00 to battery. Relay 8TP000, upon operating, locks to battery through the make contact of its transfer pair 8TP000–1(8) and through the break contact of transfer pair 8TB000–2(8) of relay 8TB000.

The portion of the circuit operation being described at this point corresponds to the connection of line finder 101 (FIG. 1) through trunk preference circuit 126 and over line 130 to the associated trunk switch.

It should be pointed out here that the operating and locking paths to battery for other trunk preference relays in the group of ten, two of which, 8TP001 and 9TP009, are shown with partial wiring, are supplied through break contacts of preceding trunk preference relays of the same group. This novel circuit arrangement assures that, even though simultaneous starts may occur in the group, only one trunk preference relay will be permitted to operate, namely, the lowest numbered relay of those affected. This arrangement effectively limits the number of recognized demands for service within a respective group to one at a time.

To further describe the above arrangement, it will be seen that the operating path for trunk preference relay 8TP001, when seized, is traced from the winding through the break contact of its transfer pair 8TP001–1(8), break contact 14HG00–2(8) of relay 14HG00, break contact 8TP000–2(8) of relay 8TP000 to battery and the locking path is traced from the winding through the make contact of the transfer pair 8TP001–1(8), break contact of transfer pair 8TB001–1(8) of relay 8TB001, break contact 8TP000–3(8) of relay 8TP000 to battery. It follows, therefore, that if relay 8TP001 is seized while the lower numbered relay 8TP000 is operated, the first-mentioned relay cannot operate since its operate path is open at break contact 8TP000–2(8) of relay 8TP000.

Similarly, the operating paths of the higher numbered trunk preference relays include break contacts 8TP000–2(8) of relay 8TP000 and 8TP001–2(8) of relay 8TP001 and similar break contacts of intervening trunk preference relays TP002 to TP008, not shown. All of these break contacts are included in the operate path of trunk preference relay 9TP009 together with the break contact of its transfer pair 9TP009–1(9) and break contact 14HG00–3(9) of relay 14HG00. The locking path for relay 9TP009 includes the make contact of its transfer pair 9TP009–1(9), the break contact of the transfer pair 9TB009–1(9) of relay 9TB009, break contacts of intervening trunk preference relays, not shown, break contact 8TP001–3(8) of relay 8TP001, and break contact 8TP000–3(8) of relay 8TP000 to battery.

While the operate and locking paths referred to above include shunt branches through make contacts of trunk-busy relays, as make contacts 8TB001–2(8) of relay 8TB001 and 8TB000–3(8) of relay 8TB000 included in the operate path and make contacts 8TB001–3(8) of relay 8TB001 and 8TB000–4(8) of relay 8TB000 included in the locking path, these shunt branches are open as the trunk-busy relays are in nonoperated position at this point.

When trunk preference relay 8TP000 operates and locks as described above, the associated horizontal group relay (HG) operates to start primary or trunk switch selection. This is the start of the operation of trunk switch selecting circuit 132 referred to above in connection with FIG. 1. Thus, referring now to FIG. 14, the associated horizontal group relay 14HG00 operates over an obvious path from battery, make contact 8TP000–4(14) of relay 8TP000, break contact 8TB000–5(14) of relay 8TB000, winding of relay 14HG00 to ground. Common parallel operating paths controlled by contacts of the other trunk preference relay are provided for relay 14HG00, the last path in the series including make contact 9TP009–2(14) of relay 9TP009 and break contact 9TB009–2(14) being shown.

Operation of relay 14HG00 completes at its make contact 14HG00–4(14) obvious operating paths for relays 14HGA00 and 14HGB00 which include the break contact of transfer pair 14HGA00–1(14) (make-before-break) of relay 14HGA00, and break contact 14HGS0–1(14) of relay 14HGS0 to battery. Upon operating, relays 14HGA00 and 14HGB00 shift from operating battery through the break contact of transfer pair 14HGA00–1(14) (which, as stated above, is make-before-break), to holding battery through the make contact of the same transfer pair and through the winding of relay 14HGS0 to the holding battery; relay 14HGS0 operates over this path.

Relay 14HGS0, operated, removes at its 14HGS0–1(14) break contact operating battery from all the other "horizontal group A and B" relays in the chain, the 14HGA10 and 14HGB10 relays and the 14HGA90 and the 14HGB90 relays of the series being shown. Also, relay 14HGA00, operated, disconnects at its 14HGA00–2(14) break contact battery to succeeding relays.

The preference lockout arrangement, just described, permits recognition and selection of only one primary switch within the horizontal group of switches. When simultaneous demands occur within a particular horizontal group, the switch electrically adjacent to the 14HGS0 relay will be first selected for service. When this switch has been served other switches waiting for service will enter their demands. The switch just served cannot compete with these demands as only one trunk preference relay associated with this switch is allowed to operate at a time.

*Link Control Circuit Operation*

Figure 19:
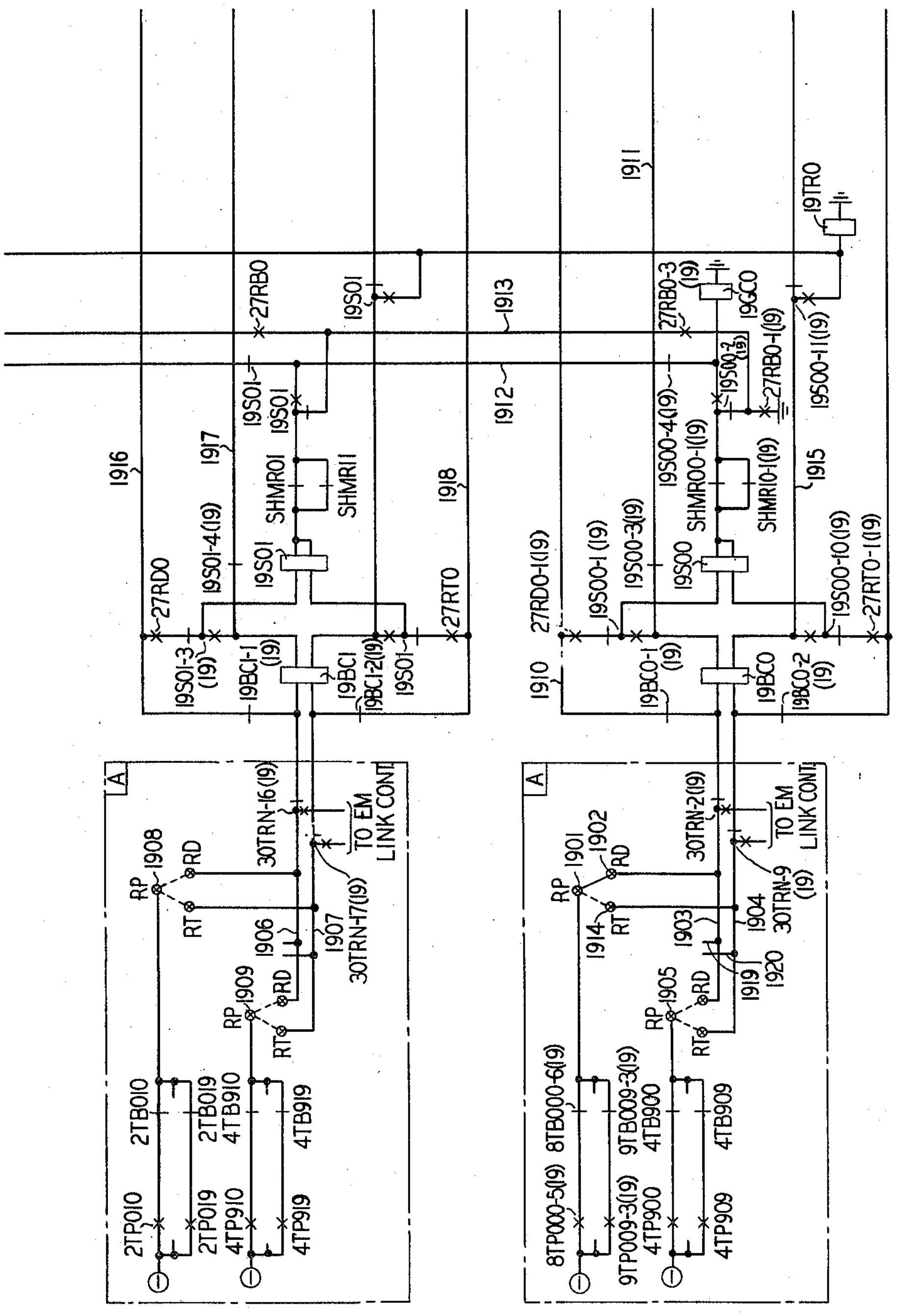
Figure 20:
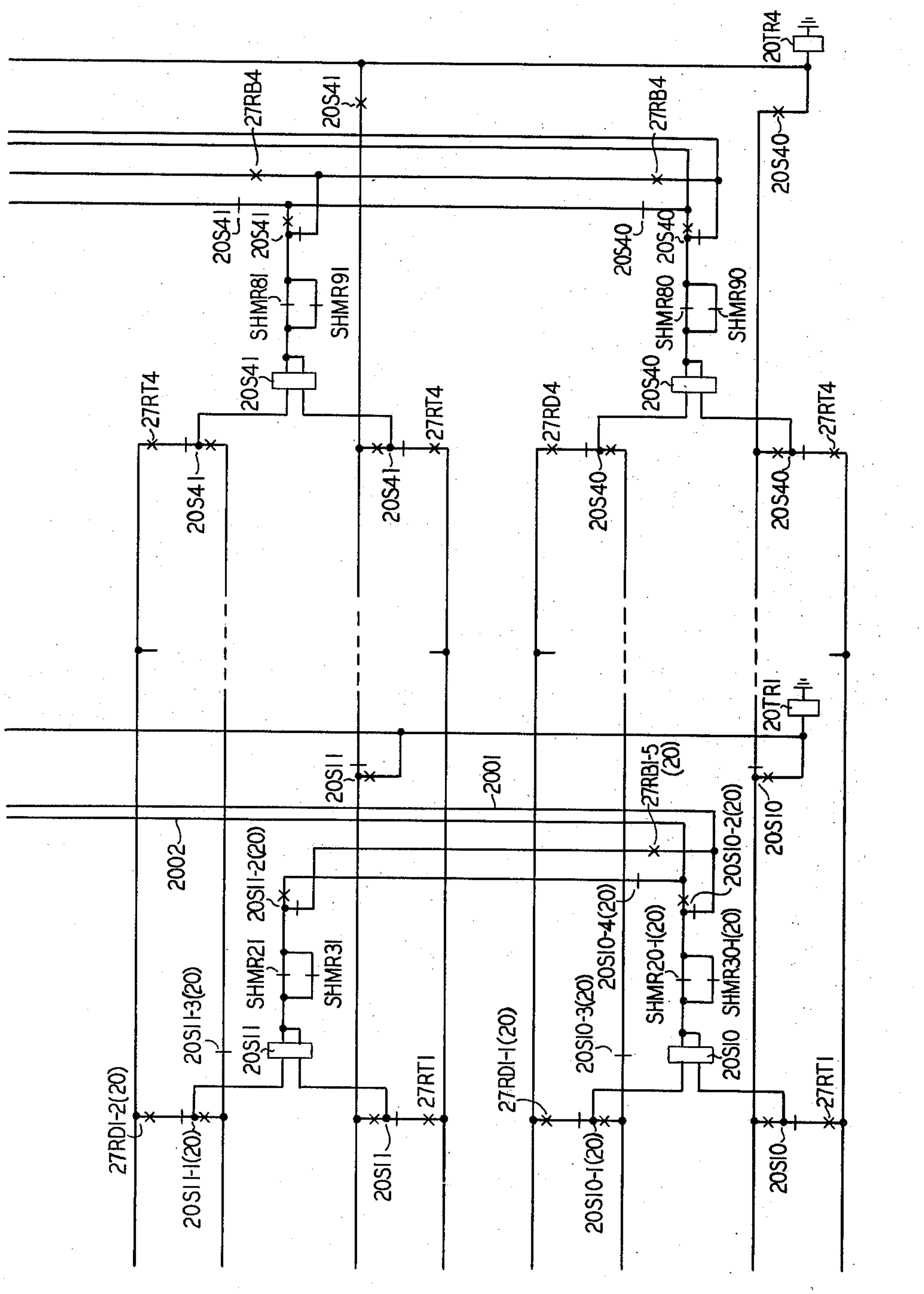
Figure 21:
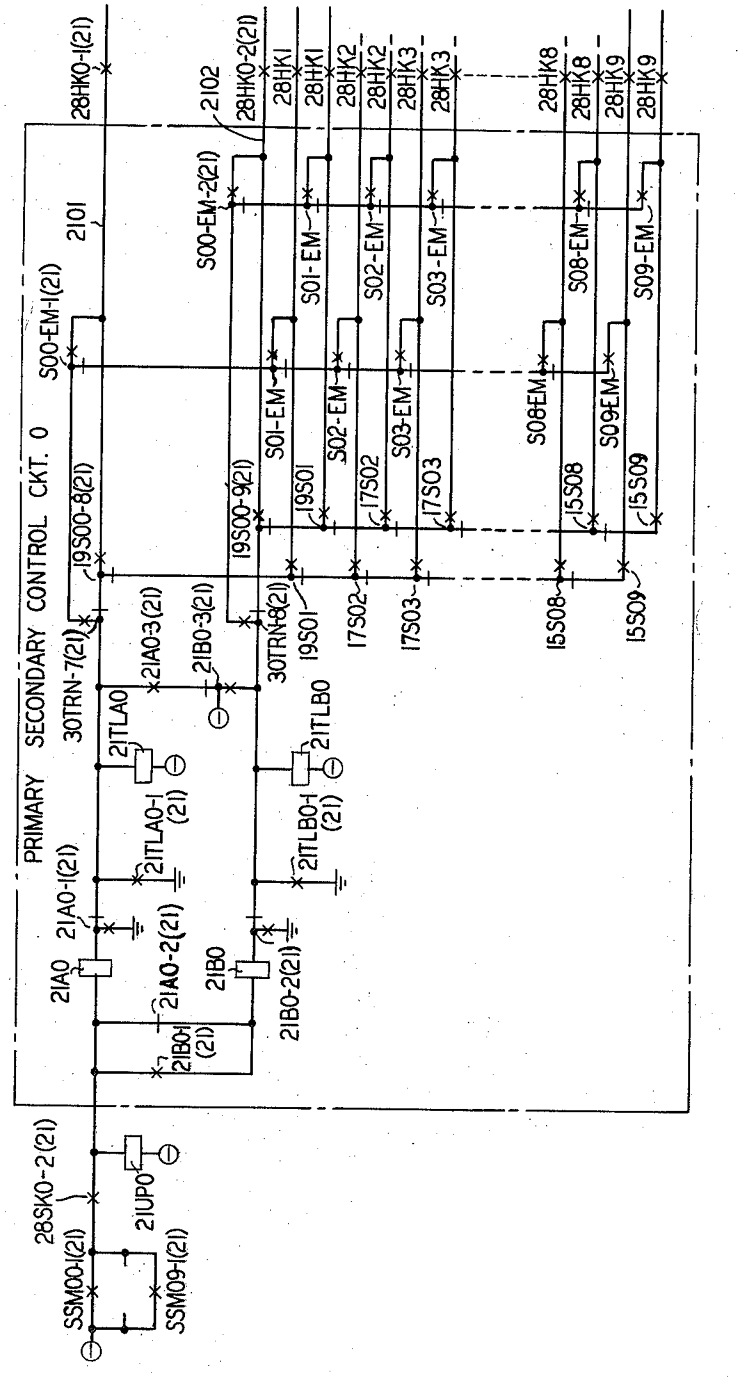
FIGS. 21, 22, 23 and 24 show particularly the primary-secondary control circuits with indication of connections to select magnets of the primary switches, the first control circuit being shown in detail and the second and last being shown as captions boxes.

As described above in reference to FIG. 1, when the trunk preference relay operated, battery was extended to the associated register preference (RP) terminal of link control circuit 131 and that terminal was cross-connected to associated terminal RD since the call being processed originated at a rotary dial station. Referring then to FIG. 19 of the detailed showing of the link control circuit, battery is supplied to RP terminal 1901 through make contact 8TP000-5(19) of relay 8TP000 and break contact 8TB000-6(19) of relay 8TB000 and is connected therefrom to RD terminal 1902.

Figure 16:
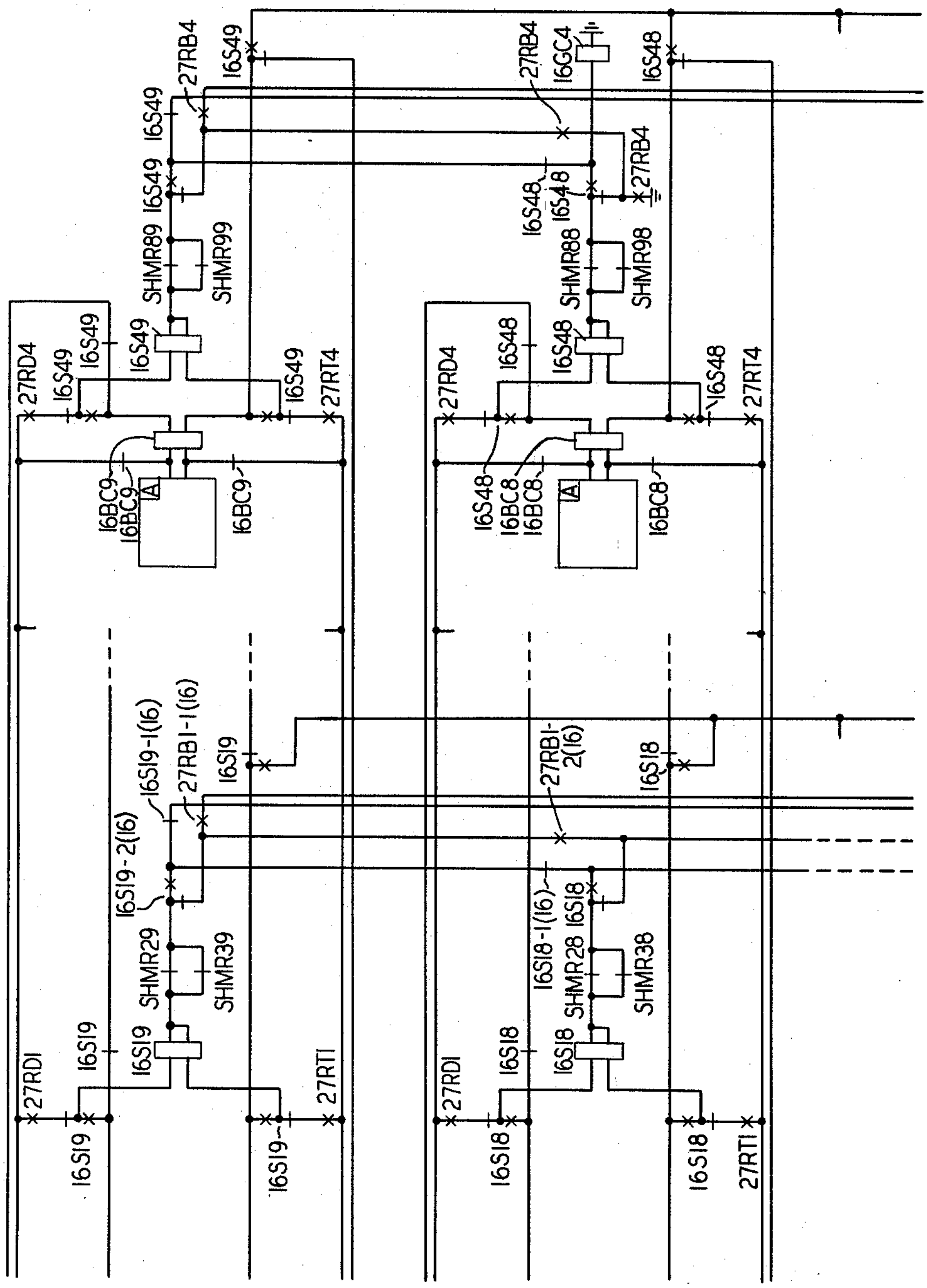
Figure 17:
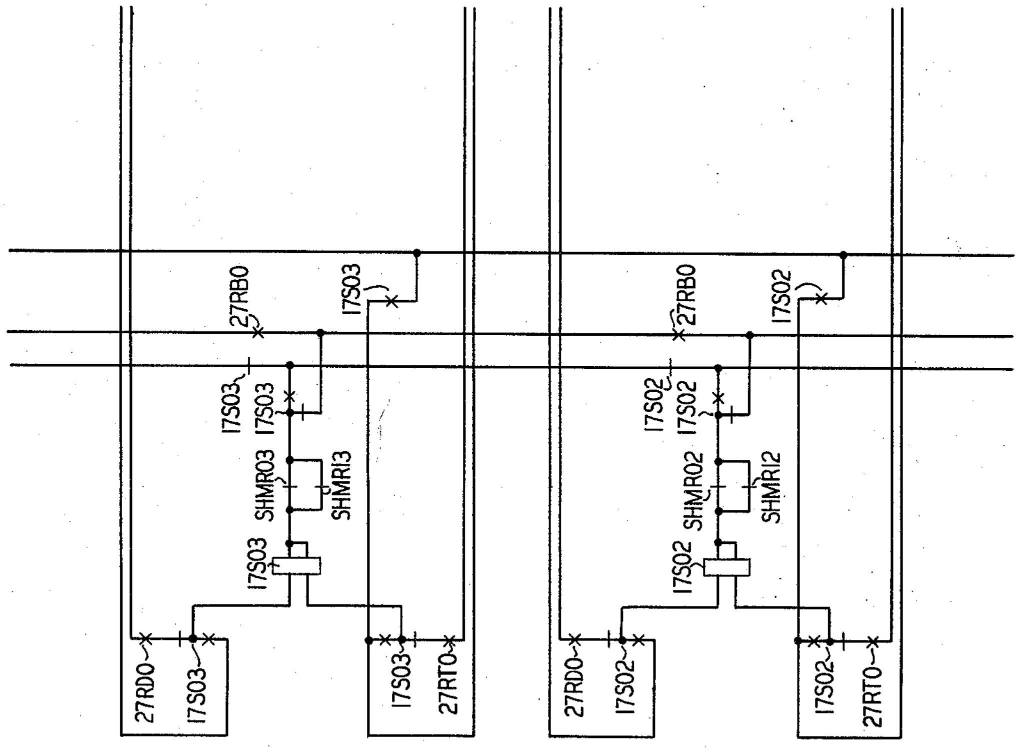
Figure 18:
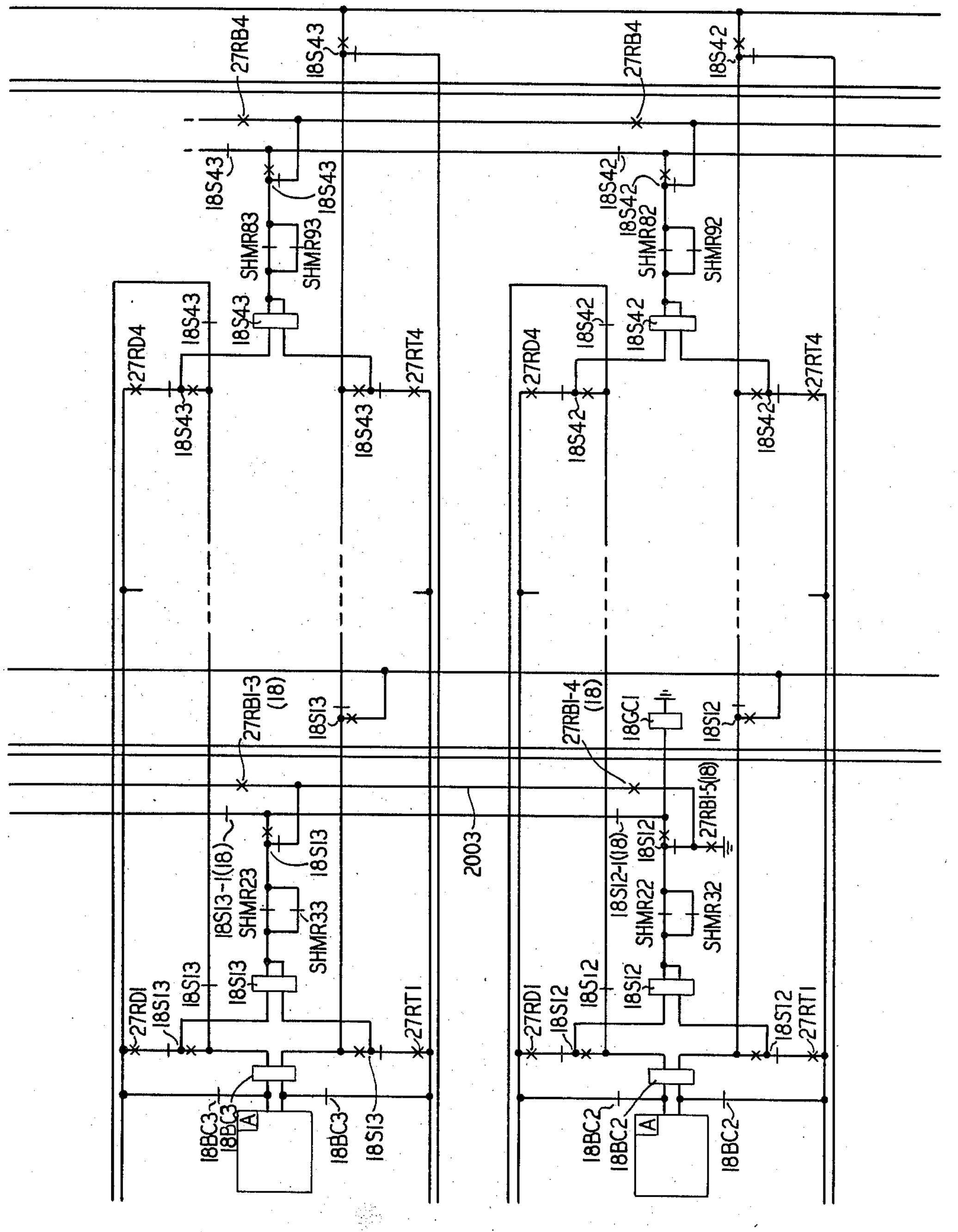

The link control circuit represented in FIGS. 15 to 20 is in the form of a matrix of vertical columns and horizontal rows of select relays. The circuit comprises five vertical columns corresponding to the five register subgroups, the first, second and last of which columns are shown with the intervening two being indicated by broken lines. Similarly, the circuit comprises ten horizontal rows corresponding to ten primary horizontal groups, the first, second, third, fourth, ninth and tenth rows being shown and the intervening four being indicated by broken lines. As mentioned previously, the five subgroups of registers are arranged in preference circuits making each subgroup the "first preference" for two horizontal groups of primary or trunk switches. Thus, register subgroup 0 is first preference for horizontal trunk switch groups 0 and 1 (first and second horizontal rows of link control), register subgroup 1 is first preference for horizontal trunk switch groups 2 and 3 (third and fourth horizontal rows of link control circuit) and so on. Accordingly, as indicated, make contacts of trunk preference relays 8TP000 to 9TP009 control the application of battery to "start" leads 1903 and 1904 of the first horizontal row of "select" relays through RP terminal 1901, while make contacts of trunk preference relays 4TP900 to 4TP909 control application of battery to these same start leads through RP terminal 1905; intervening connections are indicated by taps 1919 and 1920. (It will be recalled from the above description of the switch arrangements, FIGS. 2 to 7, that the horizontals of the primary switches of similar position are connected in multiple; that is, the lowest left switch of horizontal 0 is connected in multiple to the respective horizontals of the lowest left switch of each of the other bays. Accordingly, trunk preference relay connections corresponding to those shown, as 8TP000, 4TP900, are made to lead 1903 from each of the corresponding horizontals of similar position which are multipled.) Similarly, make contacts of trunk preference relays 2TP010 to 2TP019 control application of battery to start leads 1906 and 1907 of the second horizontal row of "select" relays through RP terminal 1908 while make contacts of trunk preference relays 4TP910 to 4TP919 control the application of battery to these same start leads through RP terminal 1909, intervening connections being again indicated by taps. The "diagonally-progressive" association of the controlling trunk preference relay contacts with the other horizontal rows of select relays is indicated in FIGS. 18 and 16 by the relative positioning of the "A" captioned boxes (corresponding to those of FIG. 19) and associated "battery control" relays. This "preference" arrangement assures an equitable distribution of the load among all the registers.

Returning now to consideration of the particular link connection being established, the battery applied to start lead 1903 through make contact 8TP000-5(19) of trunk preference relay 8TP000 passes through the break contact of transfer pair 30TRN-2(19) of relay 30TRN and break contact 19BC0-1(19) of relay 19BC0 to lead 1910. Since the condition, busy or idle, of the register subgroups is not known when the battery is connected to start lead 1903, the circuit is arranged to "consider" all subgroups and select the "most preferred" subgroup available at the moment. Therefore the start battery is made available to the select relays of all five subgroups, and the "closest" available relay will be operated and locked. In the present instance it will be assumed that select relay 19S00 is available for seizure. In the instances of all register subgroups having idle registers, the associated "RD" or "RT" relay will be operated (as will be described subsequently with particular reference to FIG. 27) and this, in turn, will cause the RB (register both) relay to operate. The battery applied over lead 1910 therefore passes through make contact 27RD0-1(19) of relay 27RD0, the break contact of the transfer pair 19S00-1(19) of relay 19S00, upper winding of relay 19S00, a break contact in the parallel group of contacts SHMR00-1(19) to SHMR10-1(19) of select hold magnets (right) SHMR00 to SHMR10 (as set forth above in the description of the showing of FIG. 1, one condition for selection of a register subgroup is that it must contain at least one idle register), break contact of transfer pair 19S00-2(19) of relay 19S00, make contact 27RB0-1(19) of relay 27RB0 to ground.

Relay 19S00, upon operating, now changes to a locking path which applies the battery on start lead 1903 through the upper winding of battery control relay 19BC0, the make contact of transfer pair 19S00-1(19) of relay 19S00 (early make-break), upper winding of relay 19S00 and break contact of select hold magnet (right) as before, make contact of transfer pair 19S00-2(19) of relay 19S00, winding of ground control relay 19GC0 to ground. Relays 19BC0 and 19GC0 operate over this path and relay 19S00 locks.

Relay 19S00, operated, interrupts at its 19S00-3(19) break contact the path over which locking battery from start lead 1903 was applied by way of line 1911 to succeeding select relays in this preference chain, that is, in the lower horizontal row. Also, relay 19S00, operated, disconnects at its break contact 19S00-4(19) the supply of locking ground through the winding of relay 19GC0 and over line 1912 to succeeding select relays of its respective vertical column. Also, ground control relay 19GC0, upon operating as above described, releases relay 27RB0. (The operation and release of relays 27RB0, 27RD0 and related relays will be discussed in detail subsequently with particular reference to FIG. 27). Release of relay 27RB0 interrupts at its make contact 27RB0-1(19) the supply of operating ground over line 1913 to the succeeding select relays of the respective vertical channel.

It follows from the above, therefore, that with regard both to the lower horizontal row and the left vertical column no select relay other than the operated 19S00 can operate and lock at this time. It should be kept in mind, however, since this is an important feature of applicants' novel arrangement, that four other paths can be set up, that is, one select relay in each of the other four rows may be operated provided each is in a respectively different column other than the left-hand column which, as just described, has been temporarily disabled with regard to additional selections by operation of relay 19S00. Thus, as previously pointed out, five calls originating in five different horizontal trunk switch groups can be simultaneously extended provided there are available idle links to a corresponding number of register subgroups having an idle register at the moment.

In order to further describe the operation of the novel link control circuit, and leaving at this point for the moment description of the link being established, let us assume that relay 27RD0 had not been operated since the particular register subgroup had no idle registers but that, on the other hand, relays 27RD1 and 27RB1 were operated. The start battery applied to line 1910, as hereinbefore described, would then pass through make contact 27RD1-1(20) of relay 27RD1, break contact of transfer pair 20S10-1(20) of relay 20S10, upper winding of relay 20S10, a break contact in the parallel group of contacts SHMR20-1(20) to SHMR30-1(20) of select hold magnets SHMR20 to SHMR 30, break contact of transfer pair 20S10-2(20) of relay 20S10, lead 2001, make contacts 27RB1-1(16), 27RB1-2(16), 27RB1-3(18), 27RB1-4(18) and 27RB1-5(18) of relay 27RB1 to ground; relay 20S10 operates.

Relay 20S10, upon operating, transfers to holding battery on lead 1911, make contact of transfer pair 20S10–1(20) of relay 20S10, upper winding of relay 20S10, break contacts of select hold magnets (R) SHMR20 to SHMR30, make contact of transfer pair 20S10–2(20) of relay 20S10, lead 2002, break contacts 16S19–1(6) of relay 16S19, 16S18–1(16) of relay 16S18, 18S13–1(18) of relay 18S13, and 18S12–1(18) of relay 18S12, winding of ground control relay 18GC1 to ground; relay 20S10 locks and relay 18GC1 operates over this path. Relay 20S10, operated, interrupts at its break contact 20S10–3(20) the path for supply of battery over lead 1911 to other select relays in the lowest horizontal row, and interrupts at its break contact 20S10–4(20) the supply of locking ground through the winding of relay 18GC1 to the succeeding select relay in the chain, relay 20S11. Operation of relay 18GC1 is followed by release of relay 27RB1 and removal of the operating ground for the select relays of the second vertical column. (As pointed out above, the operation of the RD and RB relays will be described subsequently in connection with FIG. 27.)

Figure 28:
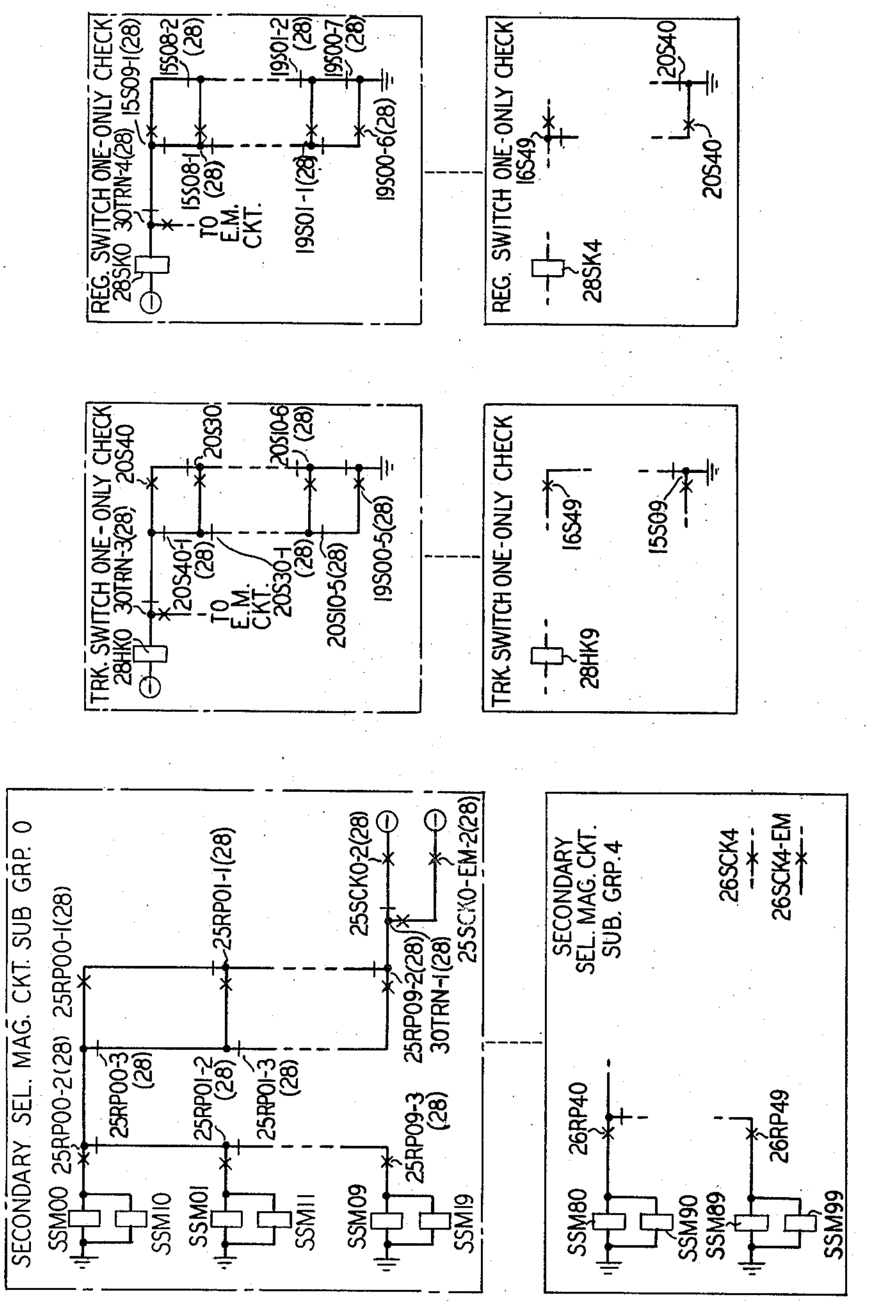
FIG. 28 shows particularly checking circuits for the trunk and register switches and operating circuits for the register switch select magnets.

Returning now to the description of the establishment of the link first referred to, it will be recalled that relay 19S00 has operated and locked. Relay 19S00 locked in operated position indicates both the horizontal trunk switch group and the register subgroup. However, before the circuit proceeds to establish the link connection it must know that only one horizontal trunk switch group has selected only one register subgroup. "Only-one-up" tests are, therefore, performed. The circuits for carrying out these tests are shown in FIG. 28 to which reference should now be made.

Referring first to the trunk switch "one-only" check circuit and assuming that relay 19S00 is the only select relay in the group which is operated at the moment, relay 28HK0 will operate from ground, the make contact of transfer pair 19S00–5(28) of relay 19S00, break contacts 20S10–5(28) of relay 20S10, 20S30–1(28) of relay 20S30, 20S40–1(28) of relay 20S40 (and similar break contacts of intervening select magnets, not shown) the break contact of transfer pair 30TRN–3(28) of relay 30TRN, winding of relay 28HK0 to battery. Relay 28HK0 operates over this path and holds since relay 19S00 is locked in operated position.

Had an intervening select relay of the group been operated when the test was made, relay 28HK0 would not have operated from the 19S00 relay since the operate path would have been open at the break contact of the particular select relay involved, for example break contact 20S10–5(28).

When relay 19S00 operates it opens at the break contact of its transfer pair 19S00–5(28) the path for supplying ground to transfer pairs of succeeding relays and therefore prevents any of the succeeding relays from operating relay 28HK0 while relay 19S00 remains operated.

Had relay 20S10 been the first in the group to operate, relay 28HK0 would then have operated over an obvious path including the break contact of transfer pair 19S00–5(28) of relay 19S00 and the make contact of transfer pair 20S10–6(28) of relay 20S10.

Referring now to the register switch "one-only" check circuit, and assuming again that relay 19S00 is the only select relay of the group which is operated, relay 28SK0 will operate over an obvious path from ground, make contact 19S00–6(28) of relay 19S00, break contact of transfer pair 19S01–1(28) of relay 19S01 (break contacts of intervening select relays not shown), the break contacts of transfer pairs 15S08–1(28) of relay 15S08 and 15S09–1(28) of relay 15S09, the break contact of transfer pair 30TRN–4(28) of relay 30TRN, winding of relay 28SK0 to battery. Relay 28SK0 operates over this path and holds since relay 19S00 is locked in operated position.

Operation of check relays 28HK0 and 28SK0 as described indicates a satisfactory "one-only" check both with regard to the horizontal trunk switch group and the register subgroup. The circuit can now proceed, therefore, to establish the link connection.

Before considering the next step in establishing the link connection being set up, further consideration may well be given to the link control circuit in order to clearly point out one of the novel and important features thereof which permits a plurality of connections to be established simultaneously.

Let us assume, therefore, that with the operations in the first horizontal row completed (that is, relays 19S00, 19BC0 and 19GC0 are operated) a second call from the next trunk switch horizontal results in application of start battery to lead 1906. Normally, that is if relay 19S00 were idle, relay 19S01 would be operated by this battery since, as pointed out above, the first register subgroup is "preferred" by both the first and second trunk switch horizontals and relay 19S01 is "superior" with regard to the second horizontal row. However, since the operation of relay 19GC0 was followed by release of relay 27RB0, the "operate" ground for relay 19S01 over lead 1913 was removed at make contacts 27RB0–3(19) and 27RB0–1(19) of relay 27RB0, and relay 19S01 cannot operate. Accordingly, the battery is applied over lead 1916 to operate select relay 20S11; relay 20S10 is of course released since relay 19S00 is operated.

Relay 20S11 is operated from the battery on lead 1916, through make contact 27RD1–2(20) of relay 27RD1, the break contact of transfer pair 20S11–1(20) of relay 20S11, upper winding of relay 20S11, break contacts of register switch hold magnets SHMR21 to SHMR31, break contact of the transfer pair 20S11–2(20) of relay 20S11, make contact 27RB1–5(20) of relay 27RB1, line 2001, make contacts 27RB1–1(16), 27RB1–2(16), 27RB1–3(18), 27RB1–4(18) and 27RB1–5(18) of relay 27RB1 to ground.

Relay 20S11, upon operating, locks from the battery on line 1906, upper winding of relay 19BC1, break contact 19S01–4(19) of relay 19S01, line 1917, make contact of transfer pairs 20S11–1(20) of relay 20S11, upper winding of relay 20S11, break contacts of register switch hold magnets SHMR21 to SHMR31, make contact of transfer pair 20S11–2(20) of relay 20S11, break contact 20S10–4(20) of relay 20S10, line 2002, break contacts 16S19–1(16) of relay 16S19, 16S18–1(16) of relay 16S18, 18S13–1(18) of relay 18S13 and 18S12–1(18) of relay 18S12, winding of relay 18GC1 to ground; relay 20S11 locks and relays 19BC1 and 18GC1 operate over this path.

Relay 20S11, operated, opens at its break contact 20S11–3(20) the path for supply of locking battery to succeeding select relays in the horizontal chain. The paths for supply of operating battery over lines 1916 and 1918 are interrupted at break contacts 19BC1–1(19) and 19BC1–2(19) of relay 19BC1. Relay 18GC1, operated, releases relay 27RB1 which removes from lines 2003 and 2001 at its make contact 27RB1–5(18) the operate ground for the other select relays of the vertical column. While relay 20S11 is operated, therefore, no other select relay in the second horizontal row and no other select relay in the second vertical column can operate and lock.

Two connections have now been initiated, one in the first horizontal row by operation of select relay 19S00 and the other in the second horizontal row by operation of relay 20S11. From the description of these operations it will be clear how similar connections are initiated in the remaining three vertical columns and in respective horizontal rows differing each from the other and from the first and second rows in which connections have already been set up. The order in which the respective select relays are operated is determined by the "preference" arrangement described above and by which relay is accordingly "superior" in the particular row for first operation if idle. For example, with regard to the third horizontal row, select relay 18S12 would be "preferred"

and would be operated if the corresponding relays of the other horizontal rows were idle, while in the last or top row, select relay 16S49 would be preferred and would be operated if the corresponding relays of the other rows were idle.

*Register Preference Circuit Operation*

As pointed out above in connection with the general description with particular reference to FIG. 1, when the checking procedures have been completed and found satisfactory, an idle register in the selected subgroup is indicated by operation of the associated register preference relay in the register preference circuit, which was assumed to be in the instance described, register preference circuit 0, box 119.

Figure 25:
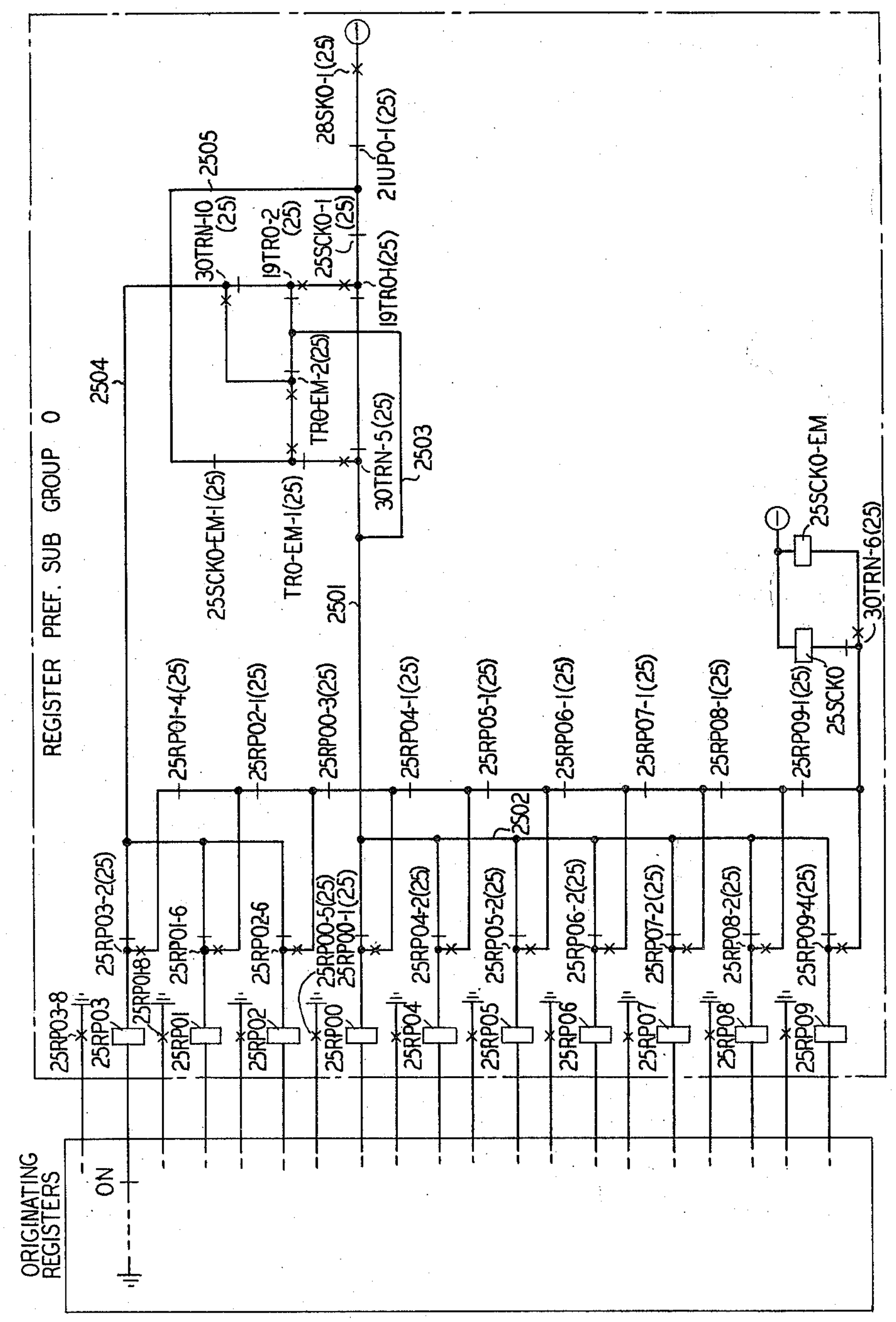
FIGS. 25 and 26 show particularly the register preference circuits, the first circuit being shown in detail and the second and last being shown as captioned boxes.
Figure 26:
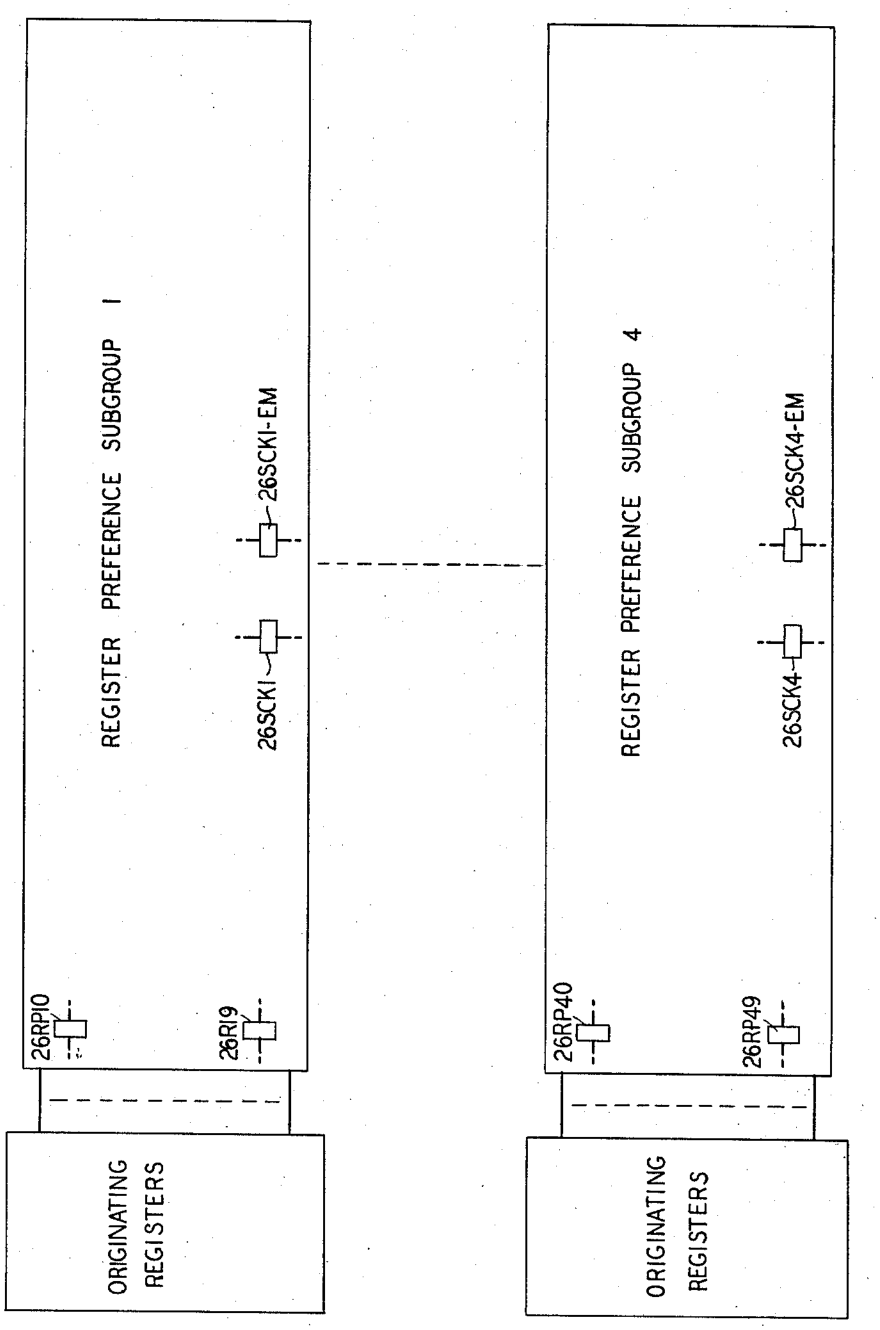

Referring now to FIGS. 25 and 26, the register preference circuit for the first register subgroup "0" is shown in detail, the register preference circuits for the second subgroup "1" and the last subgroup "4" are shown as captioned boxes and the intervening two register preference circuits are shown by dotted lines.

Register preference relays 25RP00 to 25RP09 are shown in FIG. 25, one register preference relay for each of the ten registers of the subgroup. One winding terminal of each of the relays is connected to ground through a break contact of the off-normal (ON) relay of the register. This connection is shown for the 25RP03 relay and is indicated for the other relays by broken lines. (The arrangement of the registers themselves need not be shown or described here since the exact arrangement is not of importance so far as the operation of the present circuit is involved. However, it will be understood that in accordance with normal practice, each register includes an off-normal (ON) relay which is operated while the register is in use and is released, or in normal position, while the register is idle.)

It will be recalled that in connection with the general description with particular reference to FIG. 1, it was assumed that, of the ten registers of the subgroup, seven registers served rotary dial subscribers alone while three served both dial and TOUCH-TONE subscribers. Thus the seven register preference relays 25RP00 and 25RP04 to 25RP09 (FIG. 25) are assumed to be associated with rotary dial registers alone while register preference relays 25RP03, 25RP01 and 25RP02 are assumed to be associated with the other class of registers. (It will be understood that the assignment of the registers to the two groups is an arbitrary one so far as designations are concerned. For purposes of consistency in our present description we are assuming that the register associated with relay 25RP00 is the "first" register in the rotary dial group and that the register associated with relay 25RP03 is the "first" register in the TOUCH-TONE group.)

Now, upon operation of the select check relay 28SK0, as above described, battery is applied through make contact 28SK0–1(25) of relay 28SK0 and break contacts 21UP0–1(25) of relay 21UP0, and 25SCK0–1(25) of relay 25SCK0, the break contacts of tranfer pairs 19TRO–1(25) of relay 19TRO and 30TRN–5(25) of relay 30TRN, and over leads 2501 and 2502 to all unoperated register preference relays o fthe lower or "rotary dial only" group. However, by virtue of the unique circuit provided, only the "first" or highest idle relay in the group will be permitted to operate. For example, let it be assumed in the present instance that the register with which register preference relay 25RP00 is associated is idle, in which event the left winding terminal of the relay will be connected to ground through a break contact of the ON relay. Accordingly, relay 25RP00 operates from the battery on lead 2501, and, upon operating, locks to battery through the make contact of its transfer pair 25RP00–1(25), break contacts 25RP04–1(25) of relay 25RP04, 25RP05–1(25) of relay 25RP05, 25RP06–1(25) of relay 25RP06, 25RP07–1(25) of relay 25RP07, 25RP08–1(25) of relay 25RP08 and 25RP09–1(25) of relay 25RP09, the break contact of transfer pair 30TRN–6(25) of relay 30TRN, and the winding of relay 25SCK0 to battery; relay 25SCK0 operates over this locking path of the 25RP00 relay.

Operation of relay 25RP00 completes at its make contact 25RP00–5(25) a "start" circuit for the associated register and interrupts at the break contact of its transfer pair 25RP00–1(25) the battery supply over line 2501 and it will be noted that this will be true with any other operated register preference relays, for example had relay 25RP04 been the one which operated, it would lock to the battery at relay 25SCK0 through the make contact of its transfer pair 25RP04–2(25) and the battery supply over line 2501 would be interrupted at the break contact of the same transfer pair. Also, operation of relay 25RP04 would interrupt at its break contact 25RP04–1(25) the path for the supply of locking battery from the 25SCK0 relay to the preceding register preference relay 25RP00. Similarly, operation of succeeding relays, as 25RP05, 25RP06, would cut off locking battery from all preceding register preference relays of the group.

The operation of the register preference circuit will be further described subsequently particularly with regard to TOUCH-TONE calls and "overflow."

*Select Magnet Operation—Register Switch*

Referring now to the secondary select magnet circuit=subgroup 0, FIG. 28, operation of relay 25SCK0, as described above, completes a path for operation of register switch select magnets SSM00 and SSM10, the path being traced from battery, make contact 25SCK0–2(28) of relay 25SCK0, break contact of transfer pair 30TRN–1(28) of relay 30TRN, break contact of transfer pair 25RP09–2(28) of relay 25RP09, break contact of transfer pair 25RP01–1(28) of relay 25RP01, make contact 25RP00–1(28) of relay 25RP00, make contact of transfer pair 25RP00–2(28) of relay 25RP00, windings of select magnets SSM00 and SSM10 in parallel to ground. Register switch select magnets SSM00 and SSM10 operate over this path, and it will be seen by reference to the detailed switch showing on FIG. 5 that these select magnets are associated respectively with the lowest level of register switch "0," left and right.

In the secondary select magnet circuit just described, transfer pairs and break contacts of intervening register preference relays are indicated by broken lines. These contacts provide a "one-up-only" check for the select magnets associated with the selected register.

The method of operation of the other register switch select magnets will be understood to be similar to that of SSM00 and SSM10. For example, if register preference relay 25RP01 were operated, magnets SSM01 and SSM11 (FIG. 28) would operate through make contact 25RP01–2(28), and similarly, if register preference relay 25RP09 were operated, magnets SSM09 and SSM19 would operate through make contact 25RP09–3(28).

*Available Link Selection—Trunk Switch Select Magnet Operation*

As previously set forth, the novel circuit arrangement contemplated is such that alternate paths are provided for each connection between each horizontal trunk switch and each subgroup of registers. For convenience, these alternate paths may be referred to as path A and path B, respectively. In the above general description with particular reference to FIG. 1, operation of the primary-secondary control circuit 133 is described whereby to determine whether both paths of the involved connection are available and, if so, to select one path on a "permanently preferred" basis. (It is known that at least one path must be available since, as previously brought out, it is a requirement for register subgroup selection that an idle link be available.) As will be clear from the subsequent description, when a choice is presented, that is, when both paths A and B are available, path A will always be selected.

In the detailed showing of the primary, or trunk switch, FIGS. 2 to 4, the first, third, fifth, seventh and ninth horizontal levels will be considered to be "A" paths and the second, fourth, sixth, eighth and tenth levels will be considered to be "B" paths.

With reference now to FIGS. 21 to 24 for a more detailed showing of the primary-secondary control circuit, the first control circuit "0" is shown in detail, the second and last, "1" and "4," are shown by captioned boxes, and the intervening two circuits are indicated by dotted lines.

When check relay 28HK0 operated, as described above with particular reference to FIG. 28, the two paths or links having access to the register subgroup which has been selected, that is path A, line 2101, and path B, line 2102, will be tested. For purposes of description here it will be assumed first that both paths are idle. As pointed out above, path A will always be selected under this condition.

When a link or path is idle, its register switch hold magnet will be in normal position and, accordingly, ground will be applied to paths A and B as follows: first, ground is applied through break (off-normal) contact SHMR00-2(22) of register switch hold magnet SHMR00, winding of trunk switch select magnet PSM000, make contact 14HGB00-1(22) of relay 14HGB00, make contact 28HK0-1(21) of check relay 28HK0, make contact of transfer pair 19S00-8(21) of relay 19S00, break contact of transfer pair 30TRN-7(21) of relay 30TRN, winding of relay 21TLA0 to battery; relay 21TLA0 operates over this path but the trunk switch select magnet PSM000, having different operate requirements, does not operate at this point. Second, ground is applied through break (off-normal) contact SHMR10-2(22) of register switch hold magnet SHMR10, winding of trunk switch select magnet PSM001, make contact 14HGB00-2(22) of relay 14HGB00, make contact 28HK0-2(21) of test relay 28HK0, make contact of transfer pair 19S00-9(21) of relay 19S00, break contact of transfer pair 30TRN-8(21) of relay 30TRN, winding of relay 21TLB0 to battery; relay 21TLB0 operates over this path but trunk switch select magnet PSM001, having different operate requirements, does not operate at this point.

Relay 21TLA0, operated, completes a path for operating relay 21A0, traced from ground, make contact 21TLA0-1(21) of relay 21TLA0, break contact of transfer pair 21A0-1(21) of relay 21A0, winding of relay 21A0, make contact 28SK0-2(21) of relay 28SK0, make contact (off-normal) SSM00-1(21) of register switch select magnet SSM00 to battery; relay 21A0 operates over this path and relay 21UP0 operates over an obvious portion of the path. It will be observed that the relay 21B0 is not permitted to operate from the ground on the 21TLB0-1(21) make contact of relay 21TLB0 since the operating path therefor is interrupted by operation of relay 21A0 at its break contact 21A0-2(21).

Upon operation of relay 21A0, as just described, direct battery is applied to line 2101 through the break contact of transfer pair 21B0-3(21) of relay 21B0 and make contact 21A0-3(21) of relay 21A0; trunk switch select magnet PSM000 of path A now operates. Relay 21TLA0 releases at this time since it is shunted by the battery just referred to; relay 21A0 remains operated, however, as it is locked to ground through the make contact of its transfer pair 21A0-1(21). By operation of relay 21A0, therefore, path or link A has been selected for the call.

For purposes of further describing the primary secondary control circuit, let it be assumed for the moment that in the above-described instance only path B had been available, that is, ground was not applied to line 2101 as contact SHMR00-2(22) was open. Only relay 21TLB0 would operate, therefore, and this would be followed by operation of relay 21B0 over a path from ground, make contact 21TLB0-1(21) of relay 21TLB0, break contact of transfer pair 21B0-2(21) of relay 21B0, winding of relay 21B0, break contact 21A0-2(21) of relay 21A0, make contact 28SK0-2(21) of relay 28SK0, make contact SSM00-1(21) of register switch select magnet SSM00 to battery; relay 21B0 operates, completes a shunt portion of the path through its make contact 21B0-1(21) and locks to ground through the make contact of its transfer pair 21B0-2(21).

Upon operation of relay 21B0, direct battery would then be applied to line 2102 through the make contact of transfer pair 21B0-3(21) and trunk switch select magnet PSM001 of path B would operate.

Auxiliary hold magnet 27AHM0 (FIG. 27) operates at this time from ground, make contact 25RP00-4(27) of relay 25RP00, make contact 21A0-4(27) of relay 21A0, winding of relay 27AHM0 to battery; relay 27AHM0 operates and connects through its make contact 27AHM0-1(22) an auxiliary ground to select magnet PSM000 to prevent its premature release when the register switch hold magnet which is operated for this particular call is associated with the last available link.

*Hold Magnets Operation—Trunk and Register Switches*

Considering first the primary or trunk switch, only one select magnet (PSM–) on one switch within a horizontal group of trunk switches is permitted to operate at a time; operating ground for the hold magnets is supplied through make contacts of trunk preference relays (FIG. 8) and it will be recalled that only one such relay within a trunk switch is operated at a time. In the present instance, as just described, select magnet PSM000 (FIG. 22) has operated. Two hold magnets (L and R) are required to operate in order to complete link closure on the trunk switch. The two hold magnets provide a 12-wire link. Referring now to FIG. 8, a path is completed for operating Right trunk switch hold magnet PHMR000 traced from ground, make contact PSM00-1(8) of trunk switch select magnet PSM000, make contact of transfer pair 8TP000-6(8) of trunk preference relay 8TP000, break contact of transfer pair 8TB000-7(8) of relay 8TB000, winding of hold magnet PHMR000 to battery, trunk switch hold magnet PHMR000 operates and completes at its make contact PHMR000-1(8) an obvious operating path for the corresponding Left hold magnet PHML000.

With respect to operation of the hold magnet of the register switch, when the trunk hold magnet PHMR000 (FIG. 8) operated it closed a path at its make contact PHMR000-2(8) for connection of the ground through make PSM000-1(8) to the "TC" lead 802. As indicated by the brackets and dash-dot lines, the register switch hold magnet SHMR00 (FIG. 13) is connected to this lead (now that the select magnets of both switches have operated to close the crosspoints) and the Right hold magnet SHMR00 accordingly operates. Magnet SHMR00, operated, closes at its make contact SHMR00-3(13) an obvious path for operating the associated Left hold magnet SHML00.

*Link Closure—Trunk Busy Relay Operation*

As described above, we now have in operated condition, the register switch select magnets SSM0 and SSM10, the trunk switch select magnet PSM000, the trunk switch hold magnets PHMR000 and PHML000 and the register switch hold magnets SHMR00 and SHML00. By reference to the general showing of the trunk and register switches in FIGS. 2 to 7, and with particular reference to FIGS. 2 and 5, it will be seen that operation of these particular select and hold magnets close switch crosspoints effective to close the trunk leads 8TP000 through the switches to the group of leads, indicated as 501 in FIG. 5, which connect to register "00." This link connection is also shown in more detail in FIGS. 8 to 13 where we have more complete showing of certain of the switches. Specifically, the connection of leads "T," "R," "S," "FT," "FR," "TC" and "S1"

from the trunk (FIG. 8) to the trunk switch "0," left, and trunk switch "0," right (FIG. 11) is indicated by the dot-dash line 813 and associated brackets. In addition to the seven leads mentioned, the complete link connection includes twelve leads, the additional leads being, as shown in FIG. 11, the "IC," "CU," "CT" and two spares (SP). (The designations are purely arbitrary based on the respective functions of the leads in the associated circuits. Since the five last identified leads are not involved by function in the particular circuit with which we are immediately concerned, their extensions to the respective circuits have not been shown. In fact, the two "spare" leads may, under some circumstances, remain unextended.)

The further extension of the connection from trunk switch "0" (left) to register switch "0" (left), after crosspoint closures, is indicated by dot-dash line 1101 with associated brackets, and extension of the connection from trunk switch 0 (right) and to register switch 0 (right) is indicated by dot-dash line 1102 with associated brackets. Through crosspoint closures in the register switches the connection is completed to register "00" as indicated by dot-dash lines 1301 and 1302 with brackets.

At this time through normal operation of an associated circuit element, the register-sender, ground will be connected to lead 1303 and applied thereover to the S1 terminal of the register switch and thence to lead 804. (The register-sender referred to is not shown in detail since the particular arrangement and operation thereof are not of immediate concern in the present connection. Register-senders are, of course, well known in the art.)

Referring now to FIG. 8, the ground applied to S1 lead 804, as above described, operates trunk-busy relay 8TB000 through the break contact of its transfer pair 8TB000–8(8), winding of relay 8TB000 to battery. Relay 8TB000, operated, splits the tip, ring and sleeve leads 807, 808 and 801, respectively, between the line finder and first selector. The tip 807 is opened at break contact 8TB000–10(8) of relay 8TB000 and the ring 808 is opened at break contact 8TB000–11(8), both break contacts 8TP000–8(8) and 8TP000–7(8) of relay 8TP000 having previously been opened. The sleeve lead 801 is opened at the break contact of transfer pair 8TB000–9(8) of relay 8TB000. It is noted that the "FT" and "FR" leads are now extended to the selector by tip and ring leads 807 and 808, respectively, and that the S1 lead 804 is similarly extended through sleeve lead 801 by way of the make contact of transfer pair 8TB000–8(8) of relay 8TB000.

*Disconnect*

When register "00" operates following line closure, the off-normal relay (ON) included therein will operate in the normal manner and will remove ground from the winding of register preference relay 25RP00 which will accordingly rlease. Relay 25RP00, released, releases register switch select magnets SSM00 and SSM10 (FIG. 28) as well as relays 25SCK0 and 27AHM0.

Relay 8TB000, operated, disconnects at its break contact 8TB000–6(19) start battery from lead 1903 thereby releasing relays 19S00, 19BC0 and 19GC0, and also releases relay 14HG00 by opening the operating path therefor at break contact 8TB000–5(14). Relay 14HG00, released, interrupts at its make contact 14HG00–4(14) the holding paths for relays 14HGA00 and 14HGB00 which accordingly release. Release of relay 14HGA00 is followed by release of relay 14HGS0 which was held through the make contact of transfer pair 14HGA00–1(14) of relay 14HGA00.

Figure 22:
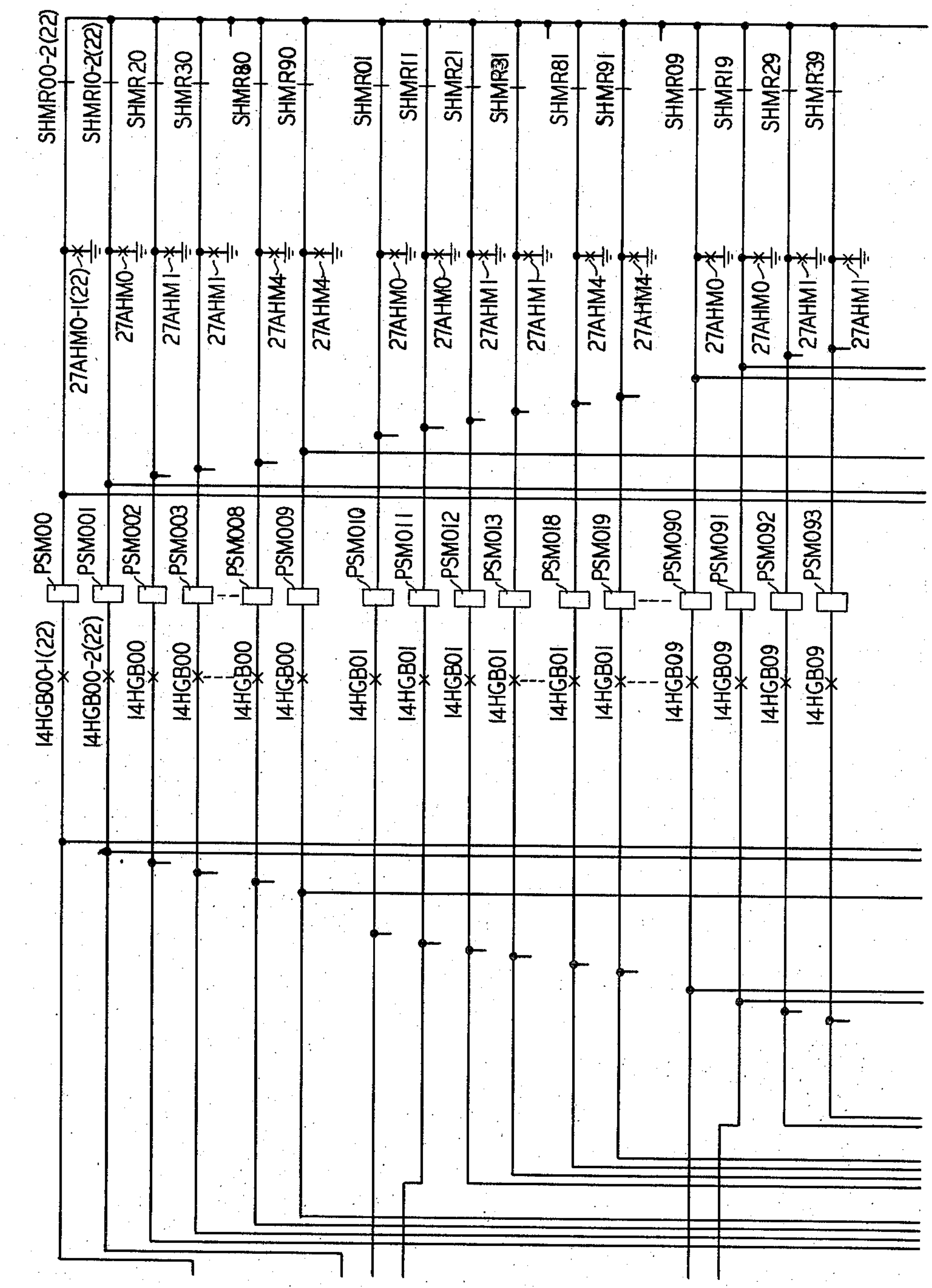
Figure 23:
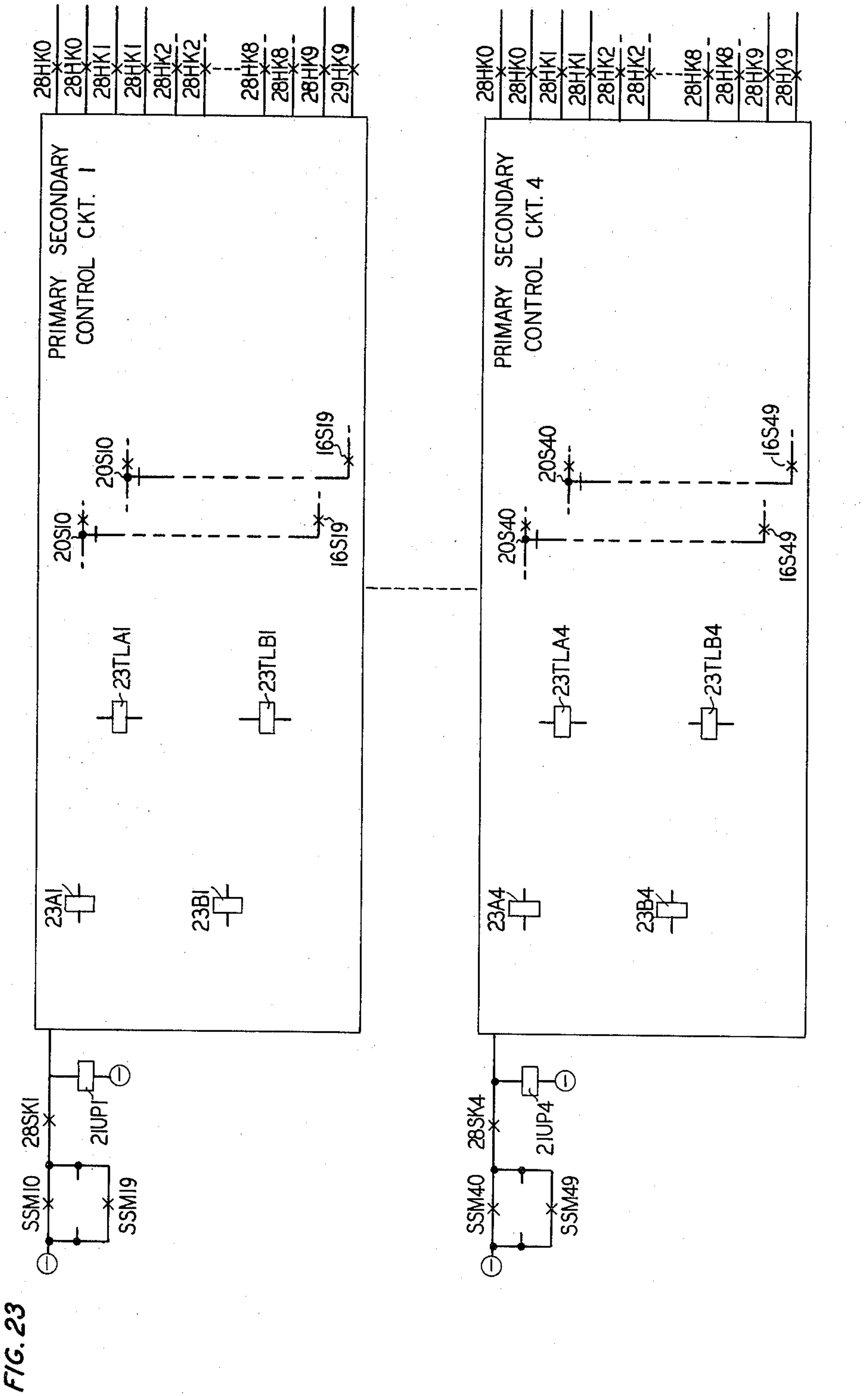
Figure 24:
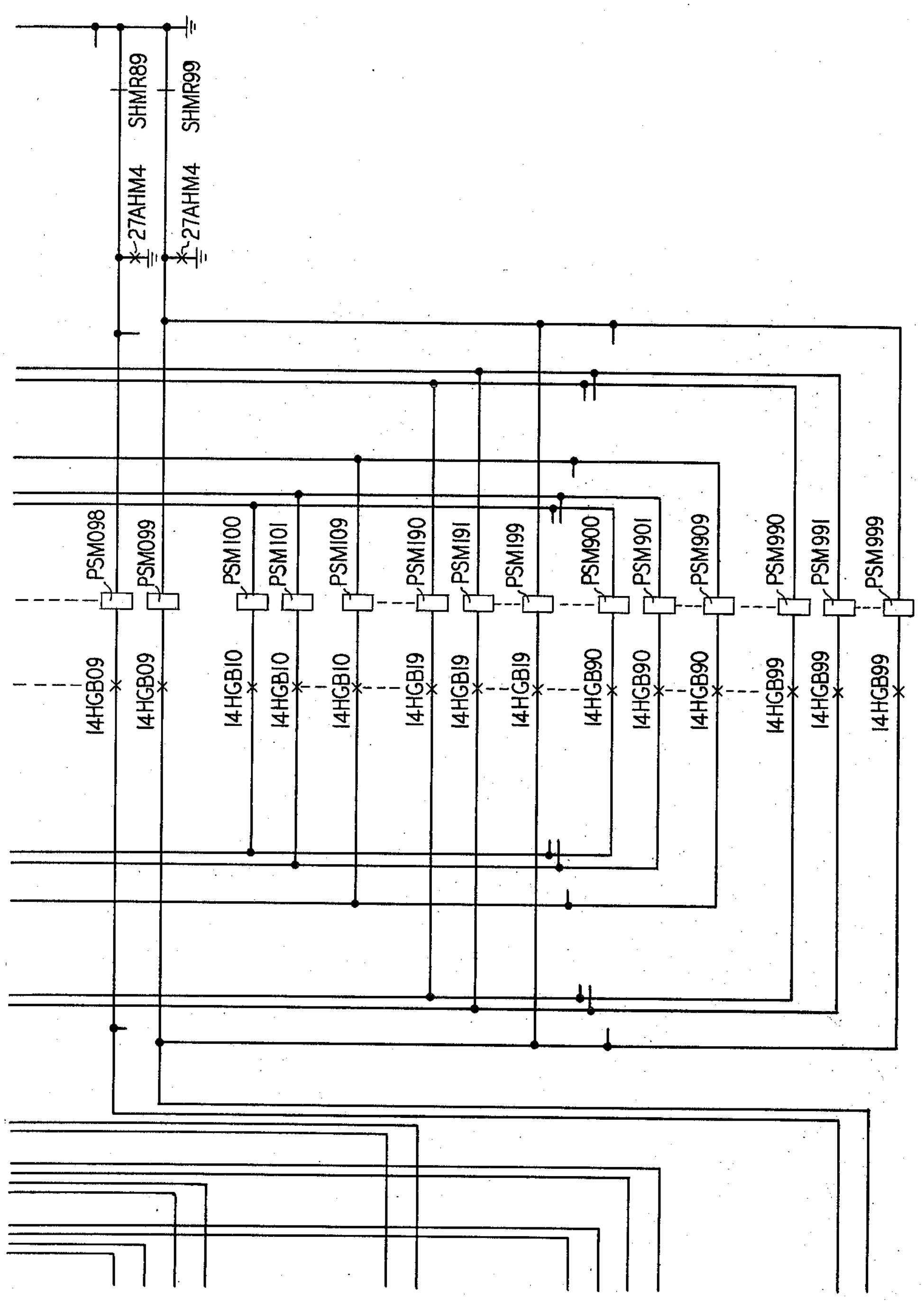

Register switch select magnet SSM00, released, opens at its make contact SSM00–1(21) the holding path for relay 21A0 which releases followed by release of trunk switch select magnet PSM000 (FIG. 22). Relay 19S00, upon releasing, also opened at the make contact of its transfer pair 19S00–5(28) the operate path for relay 28HK0 and opened at its make contact 19S00–6(28) the operate path for relay 28SK0; relays 28HK0 and 28SK0 accordingly release.

RÉSUMÉ OF ABOVE DESCRIBED OPERATIONS

It is believed that a résumé of the various operations described above as involved in establishing the link may be of value at this point since the description was necessarily lengthy and somewhat involved.

When the select relay of the link control circuit has operated (relay 19S00 in the described connection) whereby to select a particular register switch and the secondary switch one-up check relay (28SK0) has operated to indicate a "satisfactory" test, one of the ten register preference relays (FIG. 25) assigned to the particular register subgroup is operated whereby to assign a register to handle the call. The register preference relay (in our case the 25RP00) operated is the "first" idle relay in either the rotary-dial or the TOUCH-TONE group of registers, depending upon the class of call and ignoring for the moment the "overflow" arrangement which will be described subsequently.

The select magnets associated with the particular register are now operated, in the connection described magnets SSM00 and SSM10, FIG. 28. A selection is next made of one of the two links between the primary horizontal group and the secondary switch (FIGS. 21 and 22) if both links are idle, or, if only one is idle, that is selected, the associated select magnet of the trunk switch is operated (PSM000) and this in turn immediately operates the associated hold magnet of the trunk switch (PHMR000, FIG. 8). Closure of the primary crosspoints operates the secondary or register switch hold magnet associated with the link (SHMR00, FIG. 13) whereby to cut through the trunk to the register.

Operation of the off-normal relay in the register at this point operates a trunk-busy relay (relay 8TB000, FIG. 8) which splits the line tip, ring and sleeve between the line finder and first selector. Also, operation of the register off-normal relay is followed by release of the register preference relay (25RP00, FIG. 25) which in turn is followed by release of the select magnets. The link hold magnets are held from the register until it completes its functions and releases, at which point the hold magnets and the trunk preference relay release. The trunk-busy relay remains operated for the duration of the call.

*TOUCH-TONE Originated Call*

It will be recalled that the call for which the above-described link was established was assumed to have been originated at a line connected to a line finder serving only rotary dial stations. For purposes of further description it will now be assumed that the call originated at a TOUCH-TONE station or a rotary dial line connected to a line finder serving both rotary dial and TOUCH-TONE stations. In such event, referring to FIG. 19, terminal 1901 would have been cross-connected to RT terminal 1914 and the start battery would have been connected to lead 1904 instead of to lead 1903 as described. The subsequent operation would be similar in general to that described above except that in this instance relay 27RT0 would have been in operated position and relay 19S00 would operate from the battery on lead 1904, the break contact of transfer pair 30TRN–9(19) of relay 30TRN, break contact 19BC0–2(19) of relay 19BC0, make contact 27RT0–1(19) of relay 27RT0, the break contact of transfer pair 19S00–10(19) of relay 19S00, lower winding of relay 19S00 and to ground at make contact 27RB0–1(19) of relay 27RB0, as previously described.

After relay 19S00 has operated, relay 19BC0 operates through the make contact of transfer pair 19S00–10(19) and to ground at the 19GC0 relay, and, also in this instance, relay 19TR0 operates from the battery on lead 1915, the make contact of transfer pair 19S00–11(19) of relay 19S00, winding of relay 19RT0 to ground.

When the register preference circuit, FIG. 25, is reached, the possibly TOUCH-TONE originated call should be handled by one of the first three registers since these alone include converters and thus have been assigned to a group handling TOUCH-TONE calls. Assuming that the first register of the group is idle and remembering that in this instance relay 19TR0 is operated, a path is completed for operation of relay 25RP03 traced from battery, make contact 28SK0-1(25) of relay 28SK0, break contact 21UP0-(25) of relay 21UP0, break contact 25SCK0-1(25) of relay 25SCK0, make contact of transfer pair 19TR0-1(25) of relay 19TR0, make contact of transfer pair 19TR0-2(25) of relay 19TR0, break contact of transfer pair 30TRN-10(25) of relay 30TRN, line 2504, break contact of transfer pair 25RP03-2(25) of relay 25RP03, winding of relay 25RP03 to ground at the ON relay of the associated register. Relay 25RP03, operated, completes through the make contact of its transfer pair 25RP03-2(25) and through break contacts of subsequent register preference relays an obvious operating path for relay 25SCK0. Subsequent circuit operation would be similar in general to that described in connection with the first link established.

*All Rotary Dial Registers Busy—Overflow Circuit*

Figure 27:
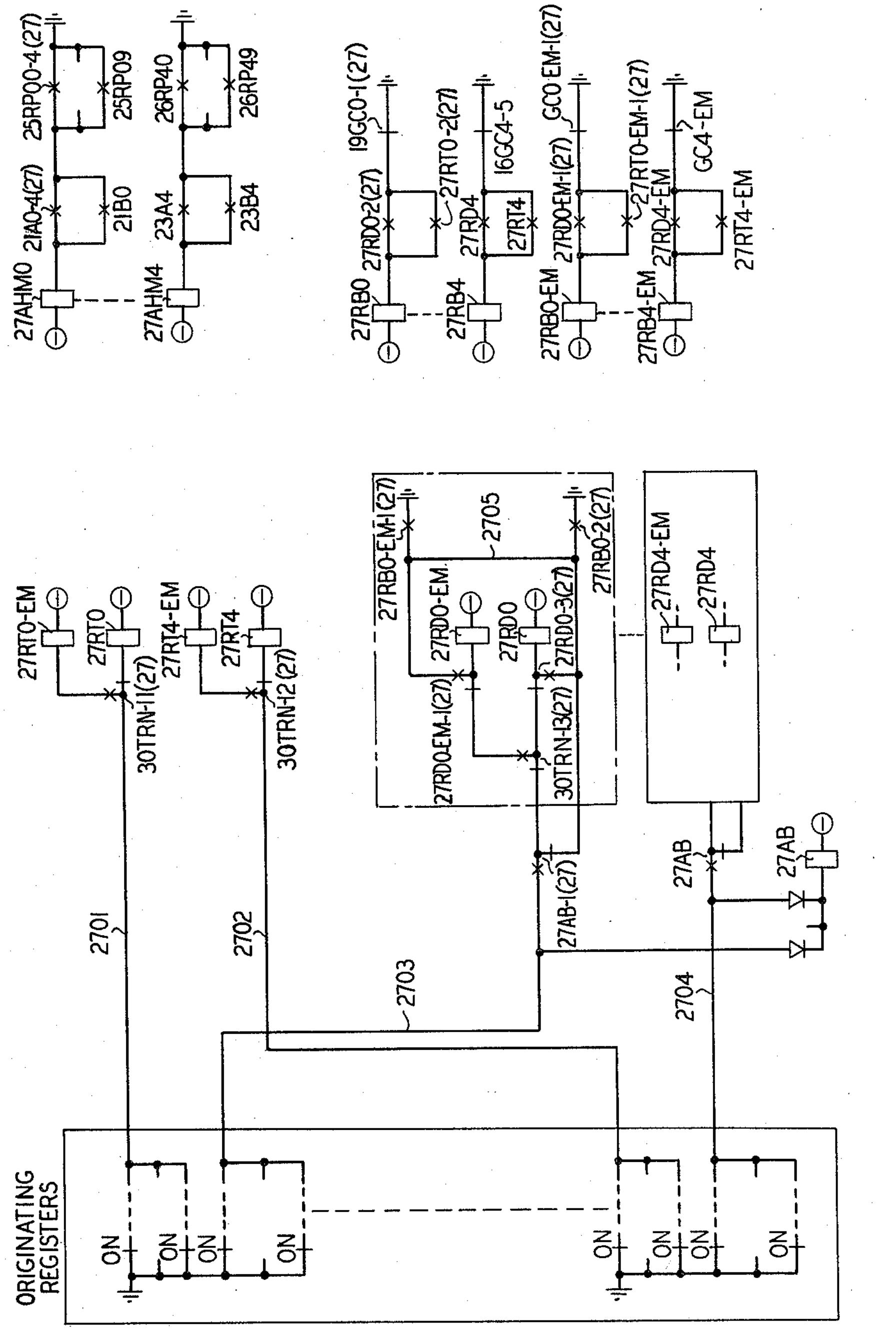
FIG. 27 shows particularly certain relay circuits which function in connection with the register preference circuits.

It has been pointed out above that in accordance with a novel and important feature of the invention, means are provided which are effective, if an attempted connection of a rotary dial call finds no rotary dial register available, to select a combined TOUCH-TONE and rotary dial register for the call if available. In order to further describe this feature at this point, let us assume that, in the instance of the first call in question which, it will be recalled, was from a line finder serving only rotary dial calls, it was found that all registers in the rotary dial group were in use. Referring first to FIG. 27, it will be recalled that the registers indicated as connected to leads 2701 and 2702 are capable of handling both TOUCH-TONE and rotary dial calls while the registers indicated as connected to leads 2703 and 2704 are capable of handling rotary dial calls only. Since all rotary dial registers are assumed to be in use, relay 27AB will release since ground is removed from both leads 2703 and 2704 at the break contacts of the respective ON relays of the registers. An idle TOUCH-TONE register, however, will apply ground over one of the control leads, assumed here to be lead 2701, and relay 27RT0 will operate, the break contact of transfer pair 30TRN-11(27) of relay 30TRN being included in this path. Relay 27RT0, operated, completes a path for operation of relay 27RB0 traced from ground, break contact 19GC0-1(27) of relay 19GC0, make contact 27RT0-2(27) of relay 27RT0, winding of relay 27RB0 to battery; relay 27RB0 operates. (Since all rotary dial registers are presumed to be in use, relay 27RD0 would be released at this time due to the absence of ground on lead 2703 and the shunt branch of the operating path of relay 27RB0 which includes make contact 27RD0-2(27) of relay 27RD0 would be open.)

(The function of the ground control relays, as 19GC0 and 18GC1, in controlling the operation and release of the RB relays, as 28RB0 and 27RB1, which has been referred to at various points above, will be clear from the above discussion of relay 27RB0.)

With relay 28RB0 operated and relay 27AB released, as just described, a path is completed for operating relay 27RD0 traced from ground, make contact 27RB0-2(27) of relay 27RB0, break contact of transfer pair 27AB-1(27) of relay 27AB, break contact of transfer pair 30TRN-13(27) of relay 30TRN, break contact of transfer pair 27RD0-3(27) of relay 27RD0, winding of relay 27RD0 to battery; relay 27RD0 operates and locks to ground through the make contact of its transfer pair 27RD0-3(27). Relay 27RD0 is now held operated through make contact 27RD0-2(27) of relay 27RD0 and it will be apparent from the preceding description that the novel circuit arrangement provided has permitted "forcing" the operation of relay 27RD0 whereby to attain the same circuit arrangement as would have prevailed had a rotary dial register been available. As soon as a rotary dial register does become available, relay 27AB will operate, relay 27RD0 will be operated in the normal way by the ground on lead 2703, and the temporary ground path will be removed at the break contact of transfer pair 27AB-1(27) of relay 27AB.

Coming now to the register preference circuit (FIG. 25), since all seven rotary dial registers are busy, the parallel battery paths from lead 2501 to the register preference relays will all be open at the break contacts of transfer pairs 25RP0-1(25) and 25RP04-2(25) to 25RP09-4(25), inclusive. Accordingly, the battery is applied through auxiliary path 2503, break contact of transfer pair 19TR0-2(25) of relay 19TR0, break contact of transfer pair 30TRN-10(25) of relay 30TRN, and over line 2504 to the group of three combined TOUCH-TONE and rotary dial registers. The first idle register of the group is seized by operation of the associated register preference relay as previously described.

*Timing Alarm and Transfer*

In the preceding general description of the link connection with particular reference to FIG. 1, transfer, alarm and release circuit 136 was described as including means for timing certain stages in the connection, and, when the time required to complete a timed function exceeds the preassigned maximum interval allowed for such function, means are initiated for transfer to an emergency network which, in many respects, is a duplicate of the normal network. Actually, as will be clear from the more detailed disclosure which follows immediately, two stages of timing are provided. One stage checks the time from the start of a call to register subgroup selection; a 20 to 40-second interval, for example, may be used for this timing. The second stage timing interval starts when the first interval is cancelled and functions until disconnect. This interval may be, for example, 3 to 6 seconds. An actual transfer is never made before a "no-calls-in-progress" check has been satisfactorily completed.

Figure 29:
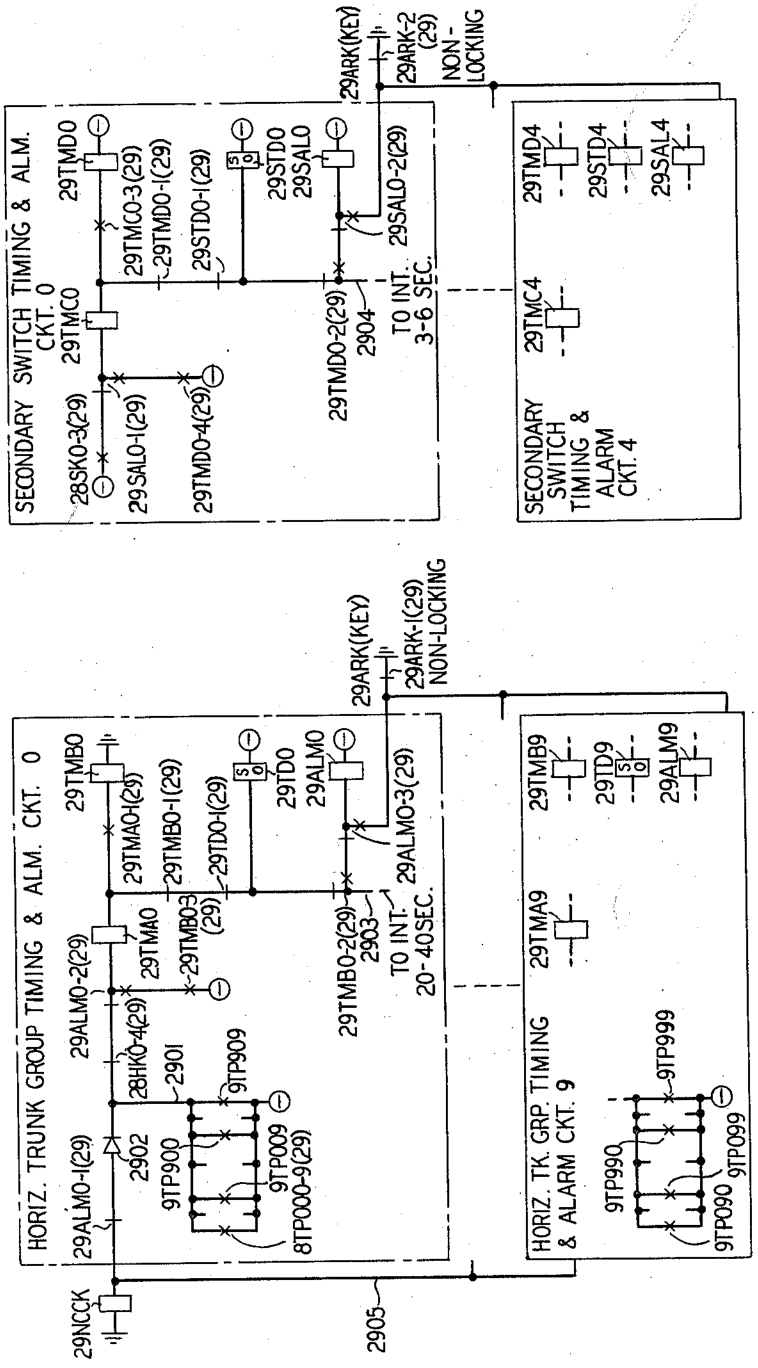
FIGS. 29 and 30 show particularly the timing, alarm, transfer and release circuits.

Considering first the primary or trunk switch timing and alarm, each horizontal group of trunk switches is associated with an alarm circuit (FIG. 29). When any trunk preference relay associated with the link operates, the no-call-check (NCCK) relay operates. Assuming, by way of example, that trunk preference relay 8TP000 is operated, no-call-check relay 29NCCK operates over a path from battery, make contact 8TP000-9(29) of relay 8TP000, line 2901, diode 2902, break contact 29ALM0-1(29) of relay 29ALM0, winding of relay 29NCCK to ground. Relay 29NCCK, operated, completes a path for operating start relay 30ST of the timing start control circuit (FIG. 30) traced from ground, make contact 29-NCCK-1(30) of relay 29NCCK, a closed break contact in the shunt group 28HK0-3(30) to 28HK9-1(30), winding of relay 30ST to battery. Start relay 30ST, operated, completes at its make contact 30ST-1(30) a path for starting common timing circuit 3001. Common timing circuit 3001 may be any one of various types of timing circuits well known in the art which include interrupters for supplying ground pulses at the required intervals.

Ground pulses are applied to lead 2903 (FIG. 29) at intervals of between 20 and 40 seconds from the common timing circuit 3001. The first ground pulse applied to lead 2903 will operate time delay relay 29TD0 which is slow-operate and is utilized to shorten the effective pulse length to relay 29TMA0. Relay 29TMA0 will operate provided an associated trunk preference relay is operated and the HK (horizontal check) relay is released. In the present instance, relay 29TMA0 will operate from the ground pulse on lead 2903, break contact of transfer pair 29TMB0-2(29) of relay 29TMB0, break contact 29TD0-1(29) of relay 29TD0 (before relay 29TD0 has operated), break contact 29TMB0–1(29) of relay 29TMB0, winding of relay 29TMA0, break contact of transfer pair 29ALM0–2(29) of relay 29ALM0, break contact 28HK0–4(29) of relay 28HK0, lead 2901, make contact 8TP000–9(29) of relay 8TP000 to battery. When the ground pulse applied to lead 2903 has ended, or when relay 29TD0 has operated to open the path at break contact 29TD0–1(29), relay 29TMB0 will operate in series with relay 29TMA0 through make contact 29TMA0–1(29) of the latter relay. When a second ground pulse is received on lead 2903, with relay 29TMB0 operated, alarm relay 29ALM0 operates from the ground pulse, the make contact of transfer pair 29TMB0–2(29) of relay 29TMB0, break contact of transfer pair 29ALM0–3(29) of relay 29ALM0, winding of relay 29ALM0 to battery; relay 29ALM0 operates and locks through the make contact of its transfer pair 29ALM0–3(29) to ground on the alarm key 29ARK through its break contact 29ARK–1(29). After operation of relay 29ALM0, relay 29TMB0 is locked to battery through its make contact 29TMB0–3(29) and the make contact of transfer pair 29ALM0–2(29) of relay 29ALM0.

Relay 29ALM0, operated, completes through its make contact 29ALM0–4(30) an obvious energizing path (which also includes make contact 29TMA0–(30) of relay 29TMA0) for alarm lamp 3002 which lights to indicate the horizontal group (0) in which the time-out occurred. Also, relay 29ALM0, upon operating, completes at its make contact 29ALM0–5(30) an energizing path for common alarm circuit 3003 which, in turn, actuates a suitable alarm. Further, relay 29ALM0 disconnects at its 29ALM0–1(29) break contact the associated horizontal group from the no-call-check facility (relay 29NCCK) and provides for operating transfer relay 30TRN under certain check conditions which will be described subsequently. Relay 29NCCK will release at this point unless there are other calls in progress as indicated by battery received over line 2905 from other timing and alarm circuits.

In the above-described sequences it is obvious, of course, that operation of the horizontal check relay (28HK0) and opening the break contact 28HK0–4(29) thereof prior to time-out would cancel timing for the particular horizontal group for the call.

With regard now to the register switch timing and alarm and referring for the moment to the secondary switch timing and alarm circuit "0" (FIG. 29) timing of the register switch functions starts upon operation of check relay 28SK0. Start relay 30ST is operated over an obvious path through make contact 28SK0–4(30) of relay 28SK0, and common timing circuit 3001 is started as before. As in the instance of the horizontal trunk group timing and alarm circuit just described, ground pulses are applied to lead 2904 from common timing circuit 3001, but in this instance at intervals of from 3 to 6 seconds. The first pulse applied to lead 2904 operates relay 29STD0 through the break contact of transfer pair 29TMD0–2(29) of relay 29TMD0. Relay 29STD0, like relay 29TD0 of the previously described timing circuit, is slow-operate and used to shorten the effective length of the pulse applied to relay 29TMC0. When relay 28SK0 operates, relay 29TMC0 will operate (before relay 29STD0 has completely operated) from the ground pulse on lead 2904, break contact of transfer pair 29TMD0–2(29) of relay 29TMD0, break contact 29STD0–1(29) of relay 29STD0, break contact 29TMD0–1(29) of relay 29TMD0, winding of relay 29TMC0, break contact of transfer pair 29SAL0–1(29) of relay 29SAL0, make contact 28SK0–3(29) of relay 28SK0, to battery.

After the ground pulse has been removed from lead 2904, or when relay 29STD0 has completely operated and opened the line at break contact 29STD0–1(29), relay 29TMD0 operates in series with relay 29TMC0 through make contact 29TMC0–3(29) of the latter relay. Now when the next ground pulse is received and with relay 29TMD0 operated, alarm relay 29SAL0 operates from the pulse through the make contact of transfer pair 29TMD0–2(29) of relay 29TMD0, break contact of transfer pair 29SAL0–2(29) of relay 29SAL0, winding of relay 29SAL0 to battery; relay 29SAL0, upon operating, locks to ground through the make contact of its transfer pair 29SAL0–2(29) and break contact 29ARK–2(29) of the nonlocking alarm key 29ARK. After operation of relay 29SAL0, relay 29TMD0 is locked to battery through the make contact of transfer pair 29SAL0–1(29) of relay 29SAL0 and its own make contact 29TMD0–4(29).

Register alarm relay 29SAL0, upon operating, performs functions similar to those described above as performed by alarm relay 29ALM0. For example, it completes through its make contact 29SAL0–4(30) an obvious path (which also includes make contact 29TMC0–1(30) of relay 29TMC0) for energizing alarm lamp 3004 which indicates the register subgroup which caused the alarm. Also, relay 29SAL0, operated, completes a path through its make contact 29SAL0–3(30) for energizing common alarm circuit 3003 whereby to initiate a suitable alarm.

It is apparent from the above description, therefore, that time-out of either the horizontal trunk switch group alarm or the register switch alarm will result in actuating a common audible alarm (common alarm circuit 3003) to direct attention to the condition as well as a respective visual indicator (lamp 3002 or 3004) to show the type (trunk or register switch) and location of the trouble. This is followed by automatic transfer to the emergency network if no calls are in progress. Either alarm relay 29ALM0 or 29SAL0, may be restored to normal by operating alarm key 29ARK to open respective break contacts 29ARK–1(29) or 29ARK–2(29). A particularly novel and valuable feature of the invention is embodied in means for preventing the actual transfer while any call is being served.

It will be recalled from the above description of the horizontal trunk group timing and alarm circuit that when a trunk preference relay is operated, that is, when a call is in progress that is, is being served, no-call-check relay 29NCCK will be operated. At this time, therefore, line 3005 of the transfer, alarm and release circuit (FIG. 30) will be open at break contact 29NCCK–2(30). Assuming now, however, that no calls are in progress and that relay 29NCCK is accordingly released, and, further, that alarm relay 29ALM0 has operated as above described, a path is completed for operation of transfer relay 30TRN traced from ground, make contact 29ALM0–6(30) of relay 29ALM0, lead 3005, break contact 29NCCK–2(30) of relay 29NCCK, break contact of transfer pair 30TRN–14(30) of relay 30TRN, winding of relay 30TRN, break contact of transfer pair 30TRNK–1(30) of transfer key 30TRNK, to battery.

Relay 30TRN, which upon operating effects network transfers as further described below, locks from the battery on the 30TRNK key, through the make contact of its transfer pair 30TRN–14(30) to ground on make contact 29ALM0–7(30) of relay 29ALM0 and also to ground through break contact 30RNK–1(30) of key 30RNK. (It will be understood, of course, that had register alarm relay 29SAL0 operated, the operation and locking paths of relay 30TRN would then include make contacts 29SAL0–5(30) and 29SAL0–6(30), respectively, of relay 29SAL0.)

The operation of relay 30TRN and transfer of the network may be also initiated manually by key operation rather than automatically upon occurrence of an alarm. Operation of manual transfer key 30TRNK completes a circuit from ground, make contact 30TRNK–2(30) of transfer key 30TRNK, lead 3005, break contact 29NCCK–2(30) of relay 29NCCK, break contact of transfer pair 30TRN–14(30) of relay 30TRN, winding of relay 30TRN, make contact of transfer pair 30TRNK–1(30) of manual transfer key 30TRNK, break contacts of chain of trunk and register switch alarm relays (break contacts 29ALM0–8(30) of relay 29ALM0, 29ALM1–1(30) of relay 29ALMI, 29ALM9–1(30) of relay 29ALM9, 29SAL0–7(30) of relay 29SAL0, 29SAL1–1(30) of relay 29SAL1 and 29SAL4–1(30) of relay 29SAL4 are shown) to battery. Relay 30TRN operates and locks through the make contact of its transfer pair 30TRN–14(30) to ground on the break contact 30RNK–1(30) of return-to-normal key 30RNK.

The condition of the circuit (normal or transfer) can be indicated visually by closing key 30LPK whereupon an energizing path is completed to ground through "normal" lamp 3006 and the break contact of transfer pair 30TRN–15(30) of transfer relay 30TRN if the relay is released, and through "transfer" lamp 3007 and the make contact of transfer pair 30TRN–15(30) of transfer relay 30TRN if the relay is operated. Relay 30RN will operate, when key 30RNK is closed from ground, make contact 30TRN–15(30) of relay 30TRN (if operated), make contact 30RNK–2(30) of key 30RNK, break contact 30TRNK–3(30) of key 30TRNK, winding of relay 30RN to battery; relay 30RN upon operating will lock to ground through its make contact 30RN–1(30) and make contact 29NCCK–5(30) of relay 29NCCK. Relay 30RN will release following release of relays 29NCCK and 30TRN.

After the alarm relay has released in the instance of automatic transfer, or when transfer key 30TRNK has been restored to normal in the instance of manual transfer, relay 30TRN may be released and the circuit restored to the normal network by operating restore-to-normal key 30RNK which removes the holding ground at its break contact 30RNK. However, just as in the instance of the transfer from the normal network to the emergency network, it is essential that restoring of the network be prevented in the event a call is in progress, and the novel circuit arrangement contemplated by the invention provides this feature. So long as a call is in progress and relay 29NCCK is accordingly operated, a holding circuit is maintained on relay 30TRN traced from battery, break contact of transfer pair 30TRNK–1(30) of transfer key 30TRNK, winding of transfer relay 30TRN, make contact of transfer pair 30TRN–14(30) of relay 30TRN, make contact 29NCCK–4(30) of relay 29NCCK to ground. Relay 30TRN is held operated over this path as long as a call is in progress and relay 29NCCK is operated, even though return-to-normal key 30RNK is operated to remove the holding ground at its break contact 30RNK–1(30). In the event key 30TRNK is operated while transfer key 30TRNK is still in operated position the holding battery is then supplied through make contact 29NCCK–3(30) of relay 29NCCK and the make contact of transfer pair 30TRNK–1(30) of key 30TRNK.

The actual transfer from the normal network to the emergency network upon operation of the transfer relay 30TRN is effected largely by operation of certain EM (emergency) relays which are paired at strategic points in the system with the "normal" relays; transfer contact pairs of the 30TRN relay effect the transfer from the respective normal relay to the paired EM relay. Complete circuit functions are maintained and, in general, only the equipment used in identifying and selecting the subgroup of registers and the trunk switch horizontal group are substituted. In certain instances, transfer contact pairs of the transfer relay 30TRN will set up connections to "emergency" circuits instead of to the "normal circuits." For example, in the link control circuits, FIGS. 15 to 20, operation of respective transfer relays will result in connection of the call to an emergency link control circuit instead of to the normal link control circuit; in general the arrangement and operation of the emergency link control circuits are the same as described above in connection with the normal link control circuits. Particular portions of the register switches are allocated to the emergency connections as dictated by the immediate circumstances.

As specific examples, referring to FIG. 19, when transfer relay 30TRN is operated, connections on lines 1903 and 1904 would be transferred to similar leads of the emergency link control through the make contacts of transfer pairs 30TRN–2(19) and 30TRN–9(19) respectively, and connections on leads 1906 and 1907 would be similarly transferred through make contacts of transfer pairs 30TRN–16(19) and 30TRN–17(19) respectively. It will be understood that the "emergency" link control circuit will include "select" relays corresponding to those of the normal link control circuit of FIGS. 15 to 20. For example, select relay S00–EM corresponds to select relay 19S00 of the normal circuit, relay S01–EM corresponds to relay 19S01 of the normal link control circuit and so on. It will be understood, further, that the emergency link control circuits include "transfer-to-TOUCH-TONE-registers" relays corresponding for example to relay 19TR0 (FIG. 19). By reference to the primary-secondary control circuit "0," FIG. 21, it will be seen that with transfer relay 30TRN operated, connections previously completed through contacts of the "normal" select relays are now completed through contacts of the corresponding "emergency" select relays. For example, with relay 30TRN operated and assuming that emergency select relay S00–EM (corresponding to normal select relay 19S00) has operated, the connection of line 2101 to relay 21TLA0 is through the make contact of transfer pair of S00–EM–1(21) of relay S00–EM and the make contact of transfer pair 30TRN–7(21) of relay 30TRN instead of through the make contact of transfer pair 19S00–8(21) of relay 19S00 and the break contact of transfer pair 30TRN–7(20) of the transfer relay. Similarly, the connection of line 2102 to relay 21TLB0 is through the make contact of transfer pair S00–EM–2(21) of relay S00–EM and the make contact of transfer pair 30TRN–8(21) of transfer relay 30TRN rather than through the make contact of transfer pair 19S00–9(21) of select relay 19S00 and the break contact of transfer pair 30TRN–8(21) of the transfer relay. It will be noted that similar transfers are made for connection of other similar paths to relays 21TLA0 and 21TLB0 when the transfer relay and an emergency select relay are operated.

With reference to the register preference circuit, FIG. 25, it will be noted that when transfer relay 30TRN is operated the previously traced paths for operating register preference relays (RP) would be open; for example the previously traced path for operating relay 25RP00 over line 2501 would be open at the break contact of transfer pair 30TRN–5(25) of relay 30TRN. The operate path is now traced from battery, make contact 28SK0–1(25) of relay 28SK0, break contact 21UP0–1(25) of relay 21UP0, line 2505, break contact 25SCK0–EM–1(25) of relay 25SCK0–EM, break contact of transfer pair TR0–EM–1(25) of relay TR0–EM, make contact of transfer pair 30TRN–5(25) of relay 30TRN and over line 2501 to relay 25RP00 as before described. Had it been found, as in the instance described above, that all rotary-dial registers were busy, the connection would be diverted from line 2501, through line 2503, the break contact of transfer pair TR0–EM–2(25) of relay TR0–EM, make contact of transfer pair 30TRN–10(25) of relay 30TRN, and over line 2504 to the TOUCH-TONE group of registers as previously described.

Assuming now, with the transfer to emergency still in effect, that the call in quetsion was a TOUCH-TONE call, relay TR0–EM (corresponding to relay 19TR0 of the normal link control circuit) would then be in operated position. A register in the TOUCH-TONE group would then be selected by operating the associated register preference relay over line 2504 from battery, make contact 28SK0–1(25) of relay 28SK0, break contact 21UP0–1(25) of relay 21UP0, line 2505, break contact 25SCK0–EM–1(25) of relay 25SCK0–EM, respective make contacts of transfer pairs TR0–EM–1(25) and TR0–EM–2(25) of relay TR0–EM, make contact of transfer pair 30TRN–10(25) of relay 30TRN, and over line 2504 to the register preference relay as before described.

After a register preference relay has operated, relay 25SCK0–EM will operate, instead of relay 25SCK0 as previously described, since the operating path will now be transferred to the first-mentioned relay through the make contact of transfer pair 30TRN–6(25) of relay 30TRN. Accordingly, the register switch select magnets (SSM) FIG. 28 will now be operated through make contact 25SCK0–EM–2(28) of relay 25SCK0–EM and the make contact of transfer pair 30TRN–1(28) of relay 30TRN rather than through make contact 25SCK0–2(28) of relay 25SCK0 and the break contact of transfer pair 30TRN–1(28) of the transfer relay.

By reference to FIG. 27 it will be seen that while transfer relay 30TRN is operated ground applied to line 2701 will operate relay 27RT0–EM instead of relay 27RT0, as previously described, and that ground applied to line 2702 will operate relay 27RT4–EM instead of relay 27RT4 as previously applied. Similarly, ground applied to line 2703 (while relay 27AB is operated) will operate relay 27RD0–EM instead of relay 27RD0 as previously described.

Relay 27RB0–EM will operate from ground, make contact GC0–EM–1(27) of relay GC0–EM (corresponding to relay 19GC0 of the normal link control circuit), make contact 27RD0–EM–1(27) of relay 27RD0–EM, winding of relay 27RB0–EM to battery. With relay 27AB released (that is in the situation described above where all rotary dial registers are busy and a TOUCH-TONE register is available) and with relay 27RB0–EM operated, relay 27RD0–EM will operate from ground, make contact 27RB0–EM–1(27) of relay 27RB0–EM, line 2705, break contact of transfer pair 27AB–1(27) of relay 27AB, make contact of transfer pair 30TRN–13(27) of relay 30TRN, break contact of transfer pair 27RD0–EM–1(27) of relay 27RD0–EM, winding of relay 27RD0–EM to battery. Relay 27RD0–EM, upon operating, locks to ground through the make contact of its transfer pair 27RD0–EM–1(27).

In the preceding description in instances of duplicated equipment, for example the plurality of respectively similar horizontal rows and vertical columns of the link control circuit, the respectively similar rows of the horizontal group selecting circuit, or the similar pairs of "A" and "B" paths of the primary-secondary control circuit, it has not been considered necessary to describe in detail each of the paths or circuits involved. In fact it has appeared desirable, in order to restrict the size of the specification so far as feasible consistent with adequate disclosure, to confine the description in each instance to a few representative paths. It will be understood, of course, that the remaining items involved operate in a manner generally the same as the corresponding representative circuits described.

It is to be understood that the above-described arrangements are illustrative of the application of the principles of the invention. Numerous other arrangements may be devised by those skilled in the art without departing from the spirit and scope of the invention. For example, it will be obvious that the matrix arrangement of relays described in connection with the link control circuit can be applied in other similar circuits such as register translator connector circuits.

What is claimed is:

1. In a communication system, a plurality of originating units of a first class, a plurality of originating units of a second class, a plurality of receiving units of a first class, a plurality of receiving units of a second class, a link for selectively providing access from said originating units of the first class to said receiving units of the first class and from said originating units of the second class to said receiving units of the second class, means effective when all receiving units of the first class are engaged for effecting a connection between an originating unit of the first class and a receiving unit of the second class, said link including a first group of relays associated respectively with said receiving units of the first class and a second group of relays associated respectively with said receiving units of the second class, a first common operating path for said first group of relays, a second common operating path for said second group of relays, an auxiliary path connecting said first and said second common operating paths, and means effective for calls originated by units of said second class for rendering ineffective both said first common operating path and said auxiliary path.

2. In a telephone system, a plurality of line finders, a plurality of groups of registers, crossbar switch link means for selectively providing connections between said line finders and said registers, and control means for said link means comprising a matrix of select relays arranged in a plurality of horizontal rows, the number of select relays in each row being the same as the number of said groups of registers, corresponding select relays of the respective horizontal rows being arranged in respective vertical columns, means for operating select relays in each of a plurality of horizontal rows whereby to establish a corresponding number of connections between respective originating units and registers, and means effective upon operation of each select relay for preventing the operation of another select relay in the same horizontal row or vertical column.

3. In a telephone system, the combination defined by claim 2 further characterized in the provision of a locking path for each of said select relays, and in that said operating means includes a path to ground common to all select relays of each respective column and that said preventing means includes means for interrupting the respective common path to ground.

4. In a telephone system, the combination defined by claim 3 further characterized in that the locking paths for each of the select relays of a respective vertical column each include a common path to ground, and in means effective upon operation of a select relay for interrupting the common path to ground of the locking path.

5. In a telephone system, the combination defined by claim 4 further characterized in that the select relays of respective rows are so arranged and connected that with regard to respective rows the relays of respectively different vertical columns are superior and first operated if the column is idle.

6. In a communication system, a plurality of originating units, a plurality of registers, a link for selectively providing connections between said originating units and said registers, a first control network for said link and an emergency control network for said link, means for timing certain steps involved in the establishment of a connection between an originating unit and a register, means effective when the time required to complete a certain step exceeds a predetermined interval to actuate an alarm, checking means for indicating when operated that a call is in progress between a respectively connected originating unit and a register, and means effective upon operation of said alarm actuating means for rendering said checking means ineffective with regard to the connection being timed.

7. In a communication system, the combination defined by claim 6 further characterized in additional means effective upon operation of said alarm actuating means to transfer from said first control network to said emergency control network and in addition means for preventing operation of said transfer means while said indicating means is operated.

8. In a communication system, the combination defined by claim 7 further characterized in means for disconnecting the emergency control network and restoring said first control network.

9. In a communication system, the combination defined by claim 8 further characterized in means for rendering said disconnecting and restoring means ineffective while said indicating means is operated.

10. In a telephone system, a plurality of line finders, a plurality of groups of dial signal registers, a link for selectively providing access from said line finders to said registers, said link comprising a plurality of primary switches of the crossbar type arranged in horizontal groups and a plurality of secondary switches also of the crossbar type, the respective line finders being connected to verticals of respective ones of said primary switches and the respective groups of registers being connected to horizontals of respective ones of said secondary switches, a pair of alternate first and second paths between each primary switch horizontal group and each group of registers, and means effective when both paths of a respective pair are idle for selecting the respective first path to the exclusion of the second path and effective when the respective first path is engaged for selecting the second path of the pair.

11. In a telephone system, the combination defined by claim 10 further characterized in that said last-mentioned means comprises a first relay in each of said first paths and a second relay in each of said second paths, an operating path for each of said relays, and means effective upon operation of the said first relay in a respective first path to open the operating path of the said second relay in the corresponding second path.

12. In a communication system, a plurality of originating units, a plurality of groups of receiving units, a link for selectively providing connections between said originating units and said receiving units, and control means for said link comprising a matrix of select relays sequentially arranged in a plurality of horizontal rows, the number of select relays in each row being the same as the number of said groups of receiving units, corresponding select relays of the respective horizontal rows being arranged in vertical columns, an operating path and a locking path for each of said relays, the operating path for each of said select relays of a respective row including a battery supply path common to all select relays of the row and a first path to ground common to all select relays of the respective vertical column, the locking path for each select relay including a second path to ground common to all relays of the respective vertical column, and means effective upon operation of a respective select relay for interrupting said first path to ground for all select relays of the respective vertical column and for interrupting said second path to ground for all select relays of the respective vertical column except said operated relay.

13. In a communication system, the combination defined by claim 12 further characterized in that said select relays of respective rows are so arranged and connected with regard to the respective common battery path that with regard to respective rows the relays of respectively different vertical columns are superior and first operated if the column is idle.

14. A telephone switching system comprising a plurality of lines, means arranging said lines into first groups and second groups, said first groups including only lines capable of transmitting rotary dial pulses and said second groups including at least some lines capable of transmitting multifrequency pulses, first originating registers for receiving only rotary dial pulses, second originating registers for receiving both rotary dial and multifrequency pulses, and a link circuit for interconnecting said groups of lines and said registers, said link circuit including means for normally connecting said first group lines to said first registers, means for connecting said second group lines only to said second registers, and means responsive to all of said first registers being busy for connecting said first group lines to said second registers.

15. A telephone switching system comprising a plurality of lines, a plurality of line finders, a first group of said line finders having connected thereto only lines capable of transmitting rotary dial pulses and a second group of line finders having connected thereto at least some lines capable of transmitting multifrequency pulses, a first group of dial pulse registers, a second group of dial pulse and multifrequency registers, and a link for selectively providing access from said line finders to said first and second groups of registers, said link comprising a plurality of primary switches and a plurality of secondary switches of the crossbar type, control means for normally establishing a path through said switches from one of said first group of line finders to one of said first group of registers and for establishing a path through said switches from one of said second group of line finders only to one of said second group of registers, and means responsive to all of said first group registers being busy for establishing said path through said switches from one of said first group of line finders to one of said second group of registers.

References Cited in the file of this patent

UNITED STATES PATENTS

| | | |
|---|---|---|
| 2,289,896 | Bakker | July 14, 1942 |
| 2,725,427 | Murray | Nov. 29, 1955 |